US011568044B2

(12) United States Patent
Butler et al.

(10) Patent No.: US 11,568,044 B2
(45) Date of Patent: Jan. 31, 2023

(54) METHOD AND APPARATUS FOR VETTING UNIVERSAL SERIAL BUS DEVICE FIRMWARE

(71) Applicant: UNIVERSITY OF FLORIDA RESEARCH FOUNDATION, INC., Gainesville, FL (US)

(72) Inventors: Kevin Butler, Gainesville, FL (US); Tuba Yavuz, Gainesville, FL (US); Jing Tian, Gainesville, FL (US); Grant Hernandez, Gainesville, FL (US); Farhaan Fowze, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 988 days.

(21) Appl. No.: 16/358,385

(22) Filed: Mar. 19, 2019

(65) Prior Publication Data
US 2019/0286817 A1 Sep. 19, 2019

Related U.S. Application Data

(60) Provisional application No. 62/644,754, filed on Mar. 19, 2018.

(51) Int. Cl.
*G06F 21/55* (2013.01)
*G06F 13/42* (2006.01)
*G06F 21/57* (2013.01)

(52) U.S. Cl.
CPC ........ *G06F 21/552* (2013.01); *G06F 13/4282* (2013.01); *G06F 21/57* (2013.01); *G06F 2213/0042* (2013.01); *G06F 2221/033* (2013.01)

(58) Field of Classification Search
CPC .... G06F 21/552; G06F 13/4282; G06F 21/57; G06F 2213/0042; G06F 21/55; G06F 13/42
See application file for complete search history.

(56) References Cited

U.S. PATENT DOCUMENTS 10,169,567 B1 * 1/2019 Pentz ............... G06N 20/20
2011/0191533 A1 * 8/2011 Coulter ............... G06F 16/13
711/112

(Continued)

OTHER PUBLICATIONS

Angel, Sebastian et al. *Defending Against Malicious Peripherals With Cinch*, in 25th {USENIX} Security Symposium ({USENIX} Security 16), (2016), pp. 397-414. arXiv preprint arXiv:1506.01449.

(Continued)

*Primary Examiner* — Quazi Farooqui
(74) *Attorney, Agent, or Firm* — Alston & Bird LLP

(57) ABSTRACT

Example embodiments provide methods, apparatuses, systems, computing devices, and/or the like for vetting USB device firmware via a USB-specific firmware analysis framework. In one example, a method is provided for analyzing firmware of a Universal Serial Bus (USB) device. The example method includes steps of receiving a firmware image extracted from the USB device, identifying signatures from the firmware image relating to USB operation, and building an expected model of operation of the USB device using the identified signatures and a database of operational information regarding USB devices. The example method further includes the steps of generating a recovered model of operation of the USB device based on the firmware image and the identified signatures, and comparing the recovered model of operation with the expected model of operation to identify unexpected or unknown behaviors. The example (Continued)

method may further include generating a report comprising the identified unexpected or unknown behaviors.

18 Claims, 31 Drawing Sheets

(56) References Cited

U.S. PATENT DOCUMENTS

2018/0324179 A1* 11/2018 Hou .................. G06F 21/51
2021/0209046 A1* 7/2021 Lefebvre ............ G06F 21/305

OTHER PUBLICATIONS

Cadar, Cristian, et al. *KLEE: Unassisted and Automatic Generation of High-Coverage Tests for Complex Systems Programs*, in Proceedings of the 8$^{th}$ USENIX Conference on Operating Systems Design and Implementation (OSDI '08), vol. 8, Dec. 8, 2008, pp. 209-224.

Chen, Daming D., et al. *Towards Automated Dynamic Analysis for Linux-Based Embedded Firmware*. Proceedings of the ISOC Network and Distributed Systems Symposium (NDSS), Feb. 21, 2016, pp. 1-16.

Chipounov, Vitaly, et al. *S2E: A Platform for In-Vivo Multi-Path Analysis of Software Systems*, in ACM SIGARCH Computer Architecture News, vol. 39, No. 1, Mar. 5, 2011, pp. 265-278.

Costin, Andrei, et al. *A Large-Scale Analysis of the Security of Embedded Firmwares*. In Proceedings of the 23rd USENIX Conference on Security Symposium ({USENIX} Security 14), (2014), pp. 95-110.

Davidson, Drew et al. *FIE on Firmware: Finding Vulnerabilities in Embedded Systems Using Symbolic Execution*, in Presented as Part of the 22nd {USENIX} Security Symposium ({USENIX} Security 13). (2013), pp. 463-478, Washington, D.C. [Retrieved from the Internet Aug. 8, 2019] <https://www.usenix.org/conference/usenixsecurity13/technical-sessions/paper/davidson>.

Di Federico, Alessandro, et al. *Rev.Ng: A Unified Binary Analysis Framework to Recover CFGs and Function Boundaries*, in Proceedings of the 26th International Conference on Compiler Construction (CC 2017), Feb. 5, 2017, pp. 131-141. ACM, New York, NY. DOI:10.1145/3033019.3033028.

Shoshitaishvili, Yan, et al. *Firmalice—Automatic Detection of Authentication Bypass Vulnerabilities in Binary Firmware*, in NDSS, Feb. 8, 2015, (15 pages).

Tian, Dave Jing, et al. *Defending Against Malicious USB Firmware with GoodUSB*. In Proceedings of the 31 st Annual Computer Security Applications Conference (ACSAC), Dec. 7, 2015, pp. 261-270. ACM.

Tian, Dave Jing, et al. *Making USB Great Again With USBFILTER*, in Proceedings of the 25$^{th}$ {USENIX} Security Symposium ({USENIX} Security 16), (2016), pp. 415-430, Austin, TX.

Yang, Bo, et al. TMSUI: *A Trust Management Scheme of USB Storage Devices for Industrial Control Systems*, in International Conference on Information and Communications Security, ICICS 2015. Lecture Notes in Computer Science, vol. 9543, (14 pages). Springer, Cham. DOI:10.1007/978-3-319-29814-6_13.

Zaddach, Jonas, et al. *AVATAR: A Framework to Support Dynamic Security Analysis of Embedded Systems' Firmwares*, in 21st Annual Network and Distributed System Security Symposium, NDSS 2014, Feb. 23, 2014, pp. 1-16, San Diego, California.

* cited by examiner

Algorithm 1 An algorithm for finding candidate instructions that copies functionality/protocol specific information to the EP0 buffer.

```
1: FindDevSpecInfoToEP0(F: Firmware, isAReg: Memory Mapping of Registers,
   type : USBprotocol)
2:  candDD ← ∅
3:  candCD ← ∅
4:  candFuncSpec ← ∅
5:  for each memory location m ∈ F.AddressSpace do
6:      if m[0] == 0X1201 then
7:          candDD ← candDD ∪ {m}
8:      else if m[0] == 0X0902 then
9:          candCD ← candCD ∪ {m}
10:     else
11:         if ((type == HID AND m[0] == 0X05010906) OR (type ==
            MASS_STORAGE AND ...) OR ... then
12:             candFuncSpec ← candFuncSpec ∪ {m}
13:         end if
14:     end if
15: end for
16: M ← PropConstMemAccesses(F, isAReg)
17: EP0₁, EP0₂ ← ∅
18: for each store instruction si ∈ F.Instructions do
19:     if M(si.src).second ∈ candCD and M(si.dst).second ≠ ⊥ then
20:         EP0₁ ← EP0₁ ∪ {M(si.dst).second}
21:     end if
22:     if M(si.src).second ∈ candDD and M(si.dst).second ≠ ⊥ then
23:         EP0₂ ← EP0₂ ∪ {M(si.dst).second}
24:     end if
25: end for
26: targetInsts, ep0 ← ∅
27: for each store instruction si ∈ F.Instructions do
28:     if M(si.src).second ∈ candFuncSpec and M(si.dst).second ∈
        (EP0₁ ∩ EP0₂) then
29:         targetInsts ← targetInsts ∪ {si}
30:         ep0 ← ep0 ∪ {M(si.dst).second}
31:     end if
32: end for
33: return (targetInsts, ep0)
```

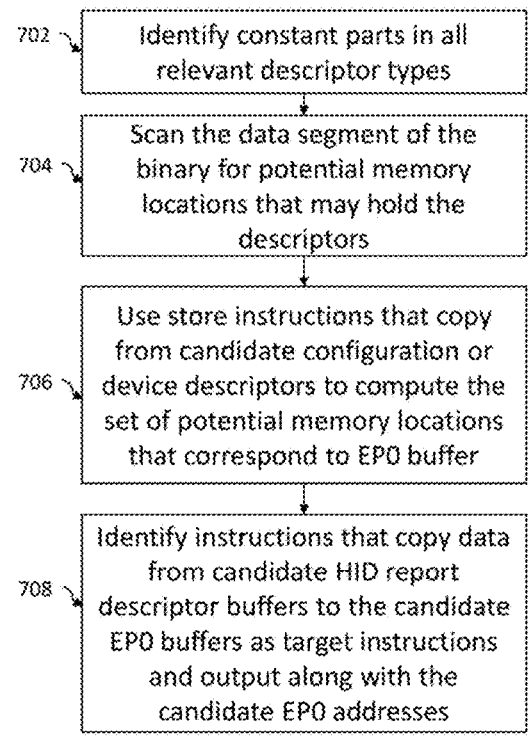

FIG. 7A

Algorithm 2 Algorithm for propagating constant memory addresses.

```
1  PropConstMemAccesses(F: Firmware, isAReg: Memory Mapping of Registers)
2  Let isAReg : F.AddressSpace → {true, false}
3  Output: M : F.Instructions × {src, dst} ↦ N ∪ {⊥} × N ∪ {⊥}
4  M ← λi, j.(⊥, ⊥)
5  worklist ← ∅
6  for each store instr. si in F.Instructions do
7      if isAConstant(si.src) and IsAReg(si.dst) then
8          worklist ← worklist ∪ {si}
9          M ← M[(si.dst) ↦ (Value(si.src), ⊥)]
10     end if
11 end for
12 while worklist not empty do
13     i ← worklist.remove()
14     for each intra-procedural use ui of i do
15         srcdef ← M(ui, src).first ≠ ⊥ or M(ui, src).second ≠ ⊥
16         dstdef ← M(ui, dst).first ≠ ⊥ or M(ui, src).second ≠ ⊥
17         if (isAStore(ui) and srcdef and dstdef) or (!isAStore(ui) and
   srcdef or dstdef) then continue
18         end if
19         if isALoad(ui) or isZext(ui) then
20             M ← M[(ui, dst) ↦ M(i, dst)]
21         else if isAStore(ui) then
22             if i.dst defines ui.dst then
23                 M ← M[(ui, dst) ↦ M(i, dst)]
24             else// i.dst defines ui.src
25                 M ← M[(ui, src) ↦ M(i, dst)]
26             end if
27         else if isGetElementPtr(ui) then
28             M ← M[(ui, dst) ↦ (⊥, M(i, dst).first)]
29         end if
30         if !isAStore(ui) or isAReg(ui.dst) then
31             worklist ← worklist ∪ {ui}
32         end if
33     end for
34 end while
```

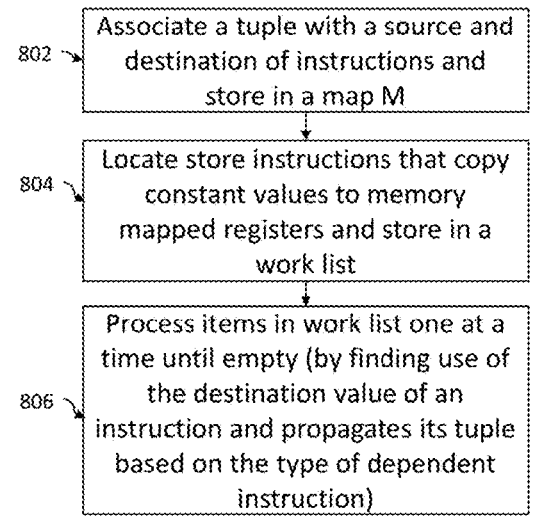

802 — Associate a tuple with a source and destination of instructions and store in a map M 804 — Locate store instructions that copy constant values to memory mapped registers and store in a work list 806 — Process items in work list one at a time until empty (by finding use of the destination value of an instruction and propagates its tuple based on the type of dependent instruction)

FIG. 8A

Algorithm 3 An algorithm for finding memory locations that should be represented symbolically.

```
1: FindSymbolicLocations(F : Firmware, τ : MaxIterations)
2: Output: P(MemoryLoc)
3: WSet : ExecutionState → P(MemoryLoc)
4: symbolicLocs : P(MemoryLoc)
5: function checkLoads(i:Instr, s: Execution State)
6:     if isALoad(i) and i ∈ f.Instructions and i.src ∉ WSet(s) ∪
       symbolicLocs then
7:         symbolicLocs ← symbolicLocs ∪ {i.src}
8:         terminate symbolic execution
9:     end if
10: end function
11: function recordStores(i:Instr, s: Execution State)
12:     if isAStore(i) and i ∈ f.Instructions and i.dst ∉ WSet(s) then
13:         WSet ← WSet[s ↦ WSet(s) ∪ {i.dst}]
14:     end if
15: end function
16: symbolicLocs ← ∅
17: for each interrupt function f do
18:     for i: 1 to τ do
19:         WSet ← λx.∅
20:         register checkLoads and recordStores as listeners for symbolic execution
21:         run symbolic execution on F with f as the only interrupt function and
            with symbolicLocs
22:     end for
23: end for
24: return symbolicLocs
```

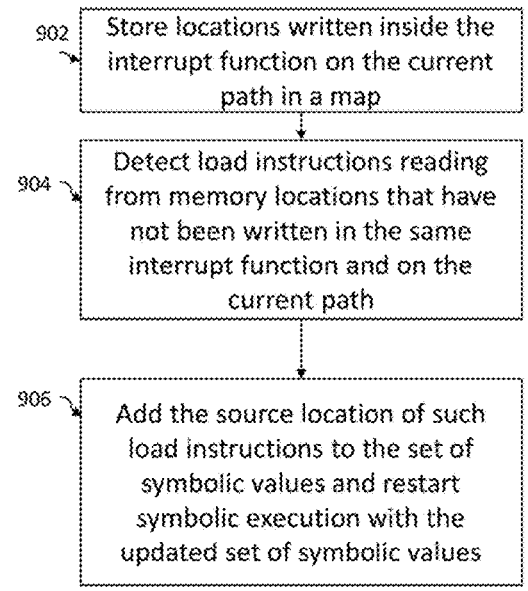

FIG. 9A

Algorithm 4 An algorithm for detecting concrete data flows to any of the endpoint buffers.

```
1: FindUnexpectedDataFlow(F : Firmware, , isAReg: Memory Mapping of
   Registers, EP0 : P(MemoryLoc), Sym : P(MemoryLoc,maxEP: int)
2: function checkConcAccesses(iInstr, s: Execution State)
3:     if i ∈ targetInstrs and isAConstant(i.src) then
4:         FlaggedAccesses ← FlaggedAccesses ∪ {i}
5:     end if
6: end function
7: OtherEPs : P(MemoryLoc)
8: OtherEPs ← ∅
9: for each i ∈ 8, 16, 32, 64, k = 1 : maxEP do
10:    for each j ∈ EP0 do OtherEPs ← OtherEPs ∪ {j + i * k}
11:    end for
12: end for
13: M : F.Instructions × {src, dst} ↦ N ∪ {⊥} × N ∪ {⊥}
14: M ← PropConstMemAccesses(F, isAReg)
15: targetInsts ← ∅
16: for each store instruction si ∈ F.Instructions do
17:    if M(si.dst).second ∈ OtherEps then targetInsts ←
       targetInsts ∪ {si}
18:    end if
19: end for
20: counters ← ∅
21: for each add or sub instruction ai ∈ F.Instructions do
22:    if exists no use ui of ai as a getElementPtr s.t. ai's result is used as an index
       then
23:        if ai.dst is a direct address then
24:            counters ← counters ∪ {Value(ai.dst)}
25:        end if
26:    end if
27: end for
28: Register checkConcAccesses as a listener and run symbolic execution with
    symbolic values Sym ∪ counters
29: return FlaggedAccesses
```

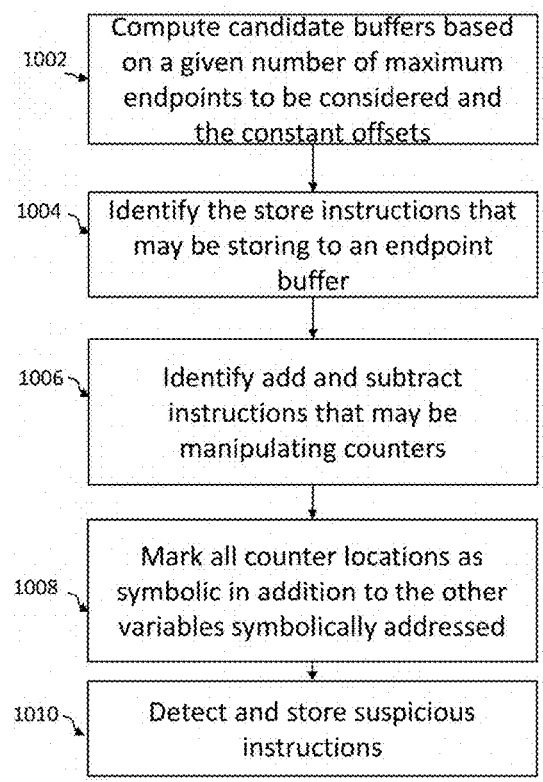

FIG. 10A

Algorithm 4
Part 2:

Algorithm 5 An algorithm for detecting inconsistent data flows.

1: FindInconsistentDataFlow(F : Firmware)
2: Sym, Conc : MemoryLoc × ContextId → Bool
3: Sym, Conc ← λx, y.false
4: FlaggedAccesses : P(Instr)
5: FlaggedAccesses ← ∅
6: function recordAccesses(i:Instr, s: Execution State)
7:    if isAStore(i) then
8:       if isSymbolic(i.src) then
9:          Sym ← Sym[(i.dst, i.blockID) ↦ true]
10:      else Conc ← Conc[(i.dst, i.blockID) ↦ true]
11:       end if
12:    end if
13: end function
14: function onSymExTermination
15:    FlaggedAccesses ← { i | Conc(i.dst, i.blockID) and
16:        ∃b.Sym(i.dst, b) and b ≠ i.blockID}
17: end function
18: Register recordSymAccesses and onSymExTermination as listeners and run symbolic execution
19: return FlaggedAccesses

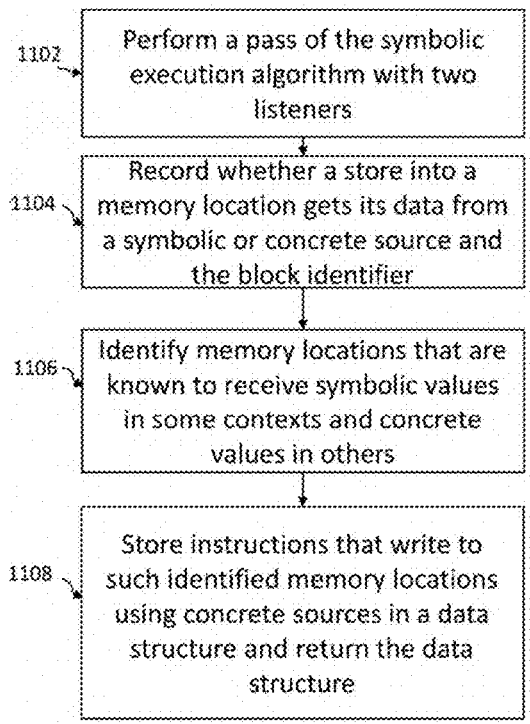

FIG. 11A

Algorithm 5 : An algorithm for detecting inconsistent data flows

Algorithm 5
Part 1:

Algorithm 5
Part 2:

```
X0bee:    mov     r7,#0              ; 0bee
X0bf0:    mov     a,r7               ; 0bf0
          mov     dptr,#X30c3        ; 0bf1
          movc    a,@a+dptr          ; 0bf4

```
BVS(XRAM[7fab][0:0]) != 0    // USBIRQ & 0x1 ?
BVS(XRAM[7fe9])      == 6    // bRequest - Descriptor
BVS(XRAM[7feb])      == 34   // wValueH - HID Report
BVS(XRAM[7fec])      == 0    // wIndexL - Keyboard Index
```

FIG. 13

METHOD AND APPARATUS FOR VETTING UNIVERSAL SERIAL BUS DEVICE FIRMWARE

CROSS REFERENCE TO RELATED APPLICATIONS

This application claims priority to U.S. Provisional Application Ser. No. 62/644,754, titled "METHOD AND APPARATUS FOR VETTING UNIVERSAL SERIAL BUS DEVICE FIRMWARE," filed Mar. 19, 2018, the contents of which are incorporated herein by reference in their entirety.

STATEMENT REGARDING FEDERALLY SPONSORED RESEARCH OR DEVELOPMENT

This invention was made with government support under grant number CNS1540217 awarded by the National Science Foundation. The government has certain rights in the invention.

BACKGROUND

In recent years, the Universal Serial Bus (USB) protocol has become ubiquitous and is supported by a vast array of devices, from smartphones to desktop PCs, small peripherals, such as flash drives, webcams, or keyboards, and even control systems and other devices that do not present themselves as traditional computing platforms. This ubiquity allows for easy connecting of devices to data and power. However, attacks that exploit USB have become increasingly common and serious. As an example, the "BadUSB" attack exploits the open nature of the USB protocol, allowing the advertisement of capabilities that device users may not realize are present. A "BadUSB" device appears to be a benign flash drive, but advertises itself as having keyboard functionality when plugged into a victim's computer; the host unquestioningly allows such a capability to be used. The malicious device is then able to inject keystrokes to the computer in order to bring up a terminal and gain administrative access. Fundamentally, there is an inability to constrain device functionality within USB, coupled with a corresponding lack of ability to know what types of functionalities a device is capable of advertising and whether or not these are benign.

Current USB vetting systems are focused on preventing USB attacks at the protocol level, through isolation-based approaches such as sandboxing and virtualization or involving the user in the authorization process. These approaches rely on a device's external actions to demonstrate its trustworthiness. Without a deeper understanding of the underlying software controlling these devices, an external observer cannot with certainty ensure that a device is trustworthy. Even solutions such as signed firmware give little evidence of its actual validity; signing merely demonstrates that an entity has applied its private key to a firmware, but does not in itself provide any assurance regarding device integrity. Consequently, there is limited ability to validate the trustworthiness and integrity of devices themselves using traditional techniques.

USB's greatest feature, its openness and expandability, is also its weakness, and attacks such as "BadUSB" exploit the unconstrained functionality afforded to these devices as a vector for compromise. Fundamentally, it is currently virtually impossible to know whether a USB device is benign or malicious.

BRIEF SUMMARY

In general, embodiments of the present invention provide methods, apparatus, systems, computing devices, computing entities, and/or the like for vetting USB device firmware via a USB-specific firmware analysis framework that uses domain knowledge of the USB protocol to examine firmware images and determine the activity that they can produce.

In embodiments, a method for analyzing firmware of a Universal Serial Bus (USB) device comprises receiving a firmware image extracted from the USB device, identifying signatures from the firmware image relating to USB operation, building an expected model of operation of the USB device using the identified signatures and a database of operational information regarding USB devices, generating a recovered model of operation of the USB device based on the firmware image and the identified signatures, and comparing the recovered model of operation with the expected model of operation to identify unexpected or unknown behaviors.

In embodiments, generating the recovered model of operation of the USB device comprises generating an intermediate representation corresponding to the firmware image, performing static analysis of the identified signatures to identify a set of target instructions relevant to an attack scenario, performing symbolic execution using the intermediate representation to identify reachability of each target instruction in the set of target instructions, and constructing the recovered model of operation of the USB device based on the static analysis of the identified signatures and the symbolic execution.

In embodiments, the method further comprises generating a report comprising at least one of the identified unexpected or unknown behaviors.

In embodiments, identifying signatures from the firmware image relating to USB operation comprises identifying constant parts in all relevant descriptor types of the firmware image, for scanning a data segment of binary of the firmware image for potential memory locations that may hold one or more of the relevant descriptors, computing a set of potential memory locations that correspond to an EP0 buffer, identifying instructions that copy data from candidate HID report descriptor buffers to candidate EP0 buffers as target instructions, and returning the identified as output along with the candidate EP0 addresses.

In embodiments, identifying signatures from the firmware image related to USB operation comprises associating a tuple with a source and destination of an instruction of the firmware image and store the tuple in a map M, locating store instructions that copy constant values to memory mapped registers and storing the located store instructions in a work list, and processing each located store instruction of the located store instructions of the work list, one at a time, until all of the located store instructions have been processed. In embodiments, a first component of the tuple represents a potential address value and a second component represents a tracked address value. In embodiments, the tracked address value represents the memory location from which data originates. In embodiments, processing a located store instruction comprises locating uses of a destination value of the located store instruction i and propagates a tuple M(i.dst) based on a type of a dependent instruction.

In embodiments, the method further comprises identifying memory locations that need to be represented symbolically, wherein identifying the memory locations comprises storing locations written inside an interrupt function on a current path in a map that is registered with a symbolic execution engine, detecting load instructions reading from memory locations that have not been written in a same interrupt function and on the current path, adding a source location of a detected load instruction to a set of symbolic values, and restarting symbolic execution using an updated set of symbolic values comprising the source location.

In embodiments, the method comprises detecting concrete data flows to endpoint buffers. In embodiments, detecting the concrete data flows comprises computing candidate endpoint buffers based on a given number of maximum endpoints to be considered and constant offsets identifying store instructions that may be storing to an endpoint buffer, identifying add and subtract instructions that may be manipulating counters, marking all counter locations as symbolic in addition to the other variables symbolic addressed that have been passed as an input in the image, and detecting and storing suspicious instructions.

In embodiments, the method comprises detecting inconsistent data flows. In embodiments, detecting inconsistent data flows comprises executing a symbolic execution algorithm with one or more listeners, recording whether a store into a memory location gets its data from a symbolic or a concrete source along with an associated block identifier as context information, upon termination of the symbolic execution algorithm, identifying memory locations that are known to receive symbolic values in some contexts and concrete values in others, storing instructions that write to such memory locations using concrete sources, and returning the instructions.

BRIEF DESCRIPTION OF THE SEVERAL VIEWS OF THE DRAWINGS

Figure 1:
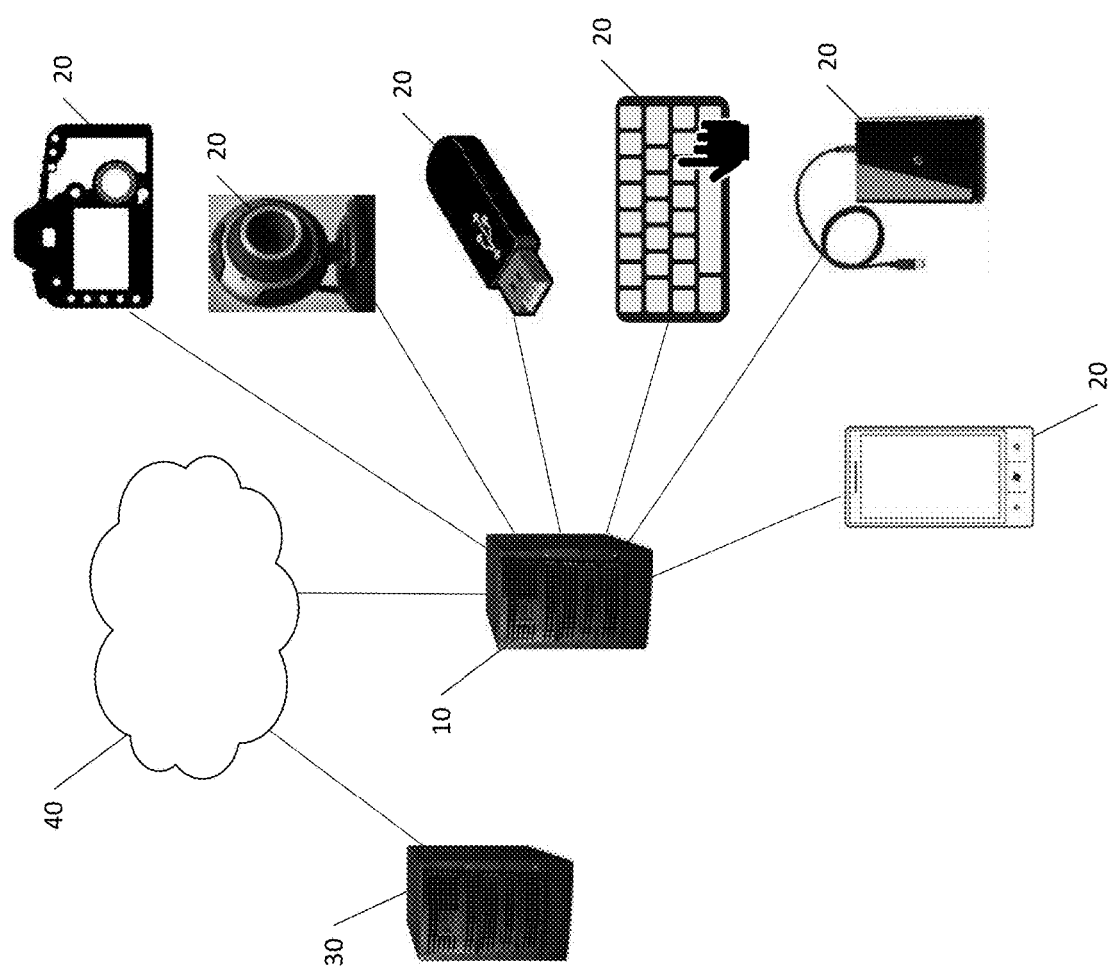
Figure 2:
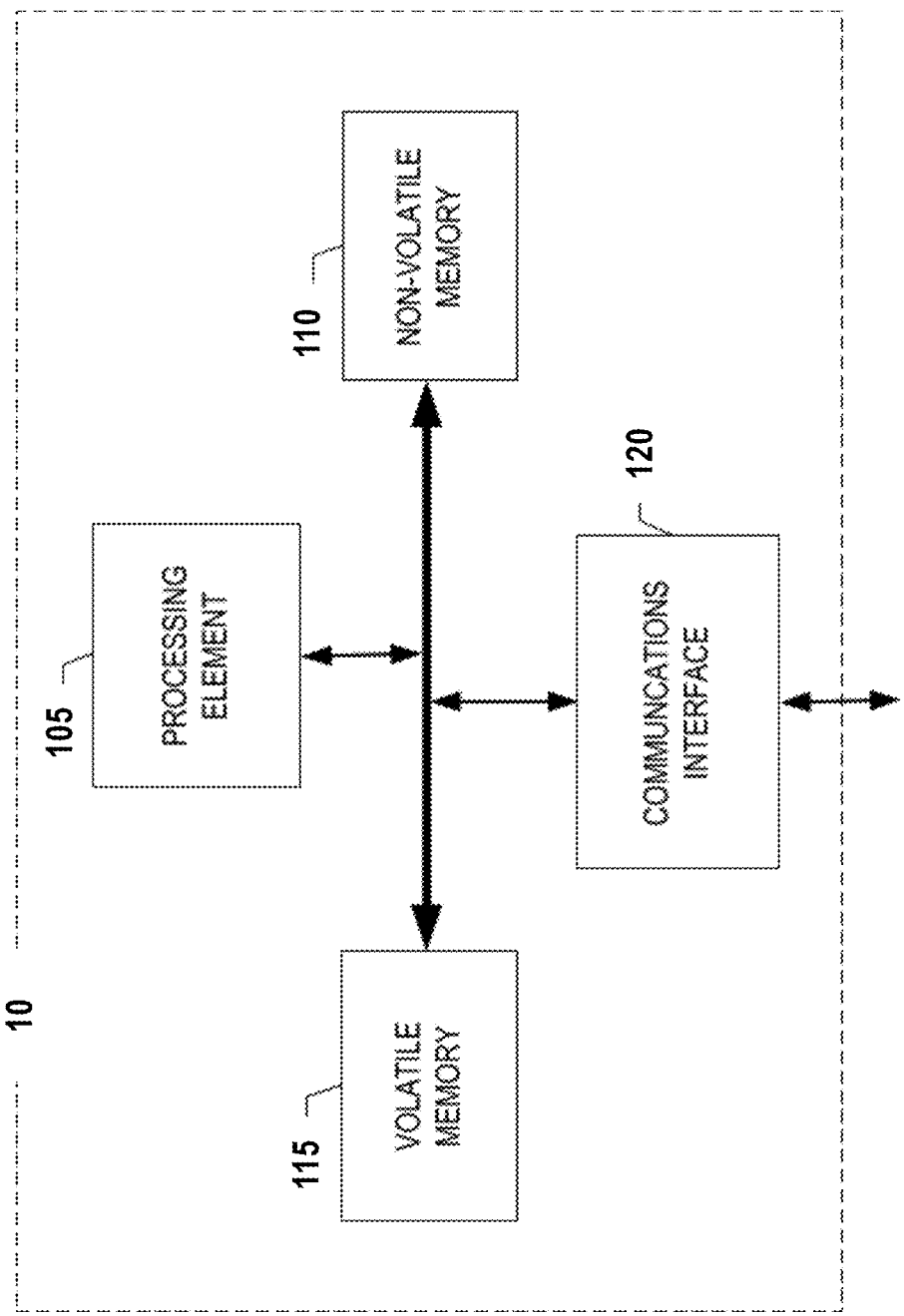
Figure 3:
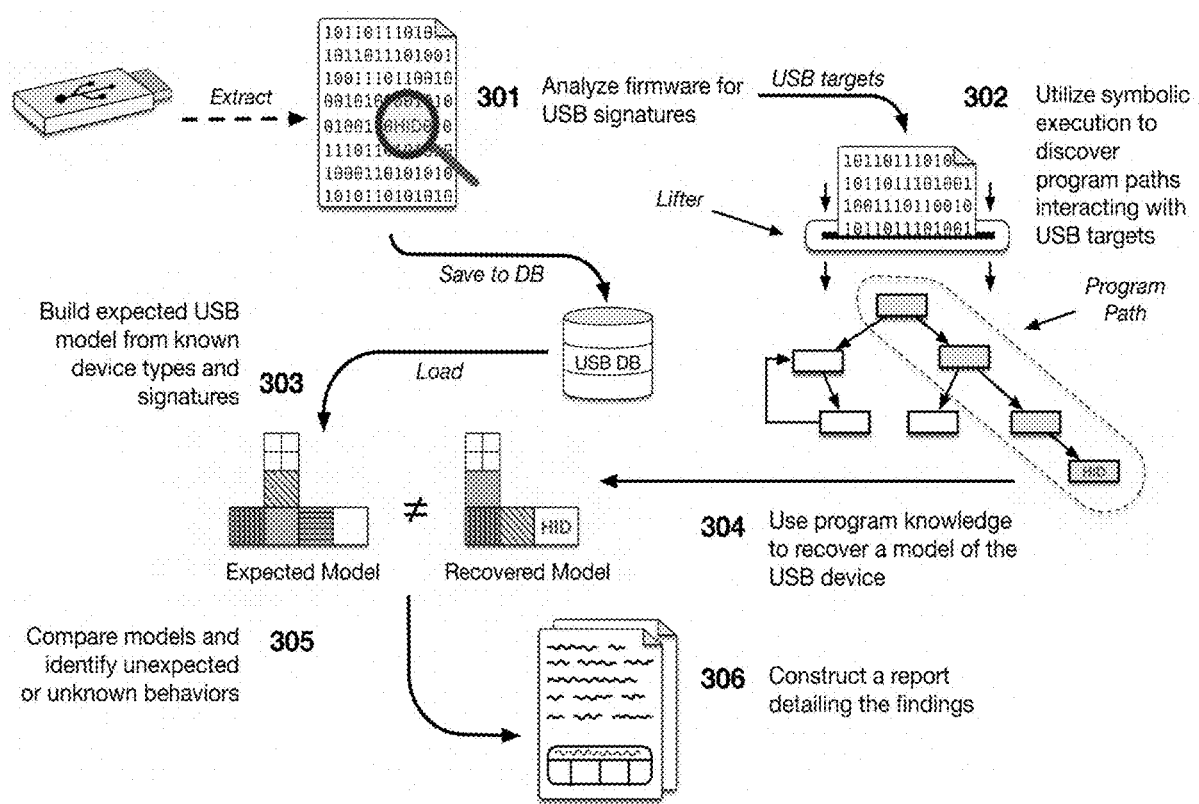
Figure 4:
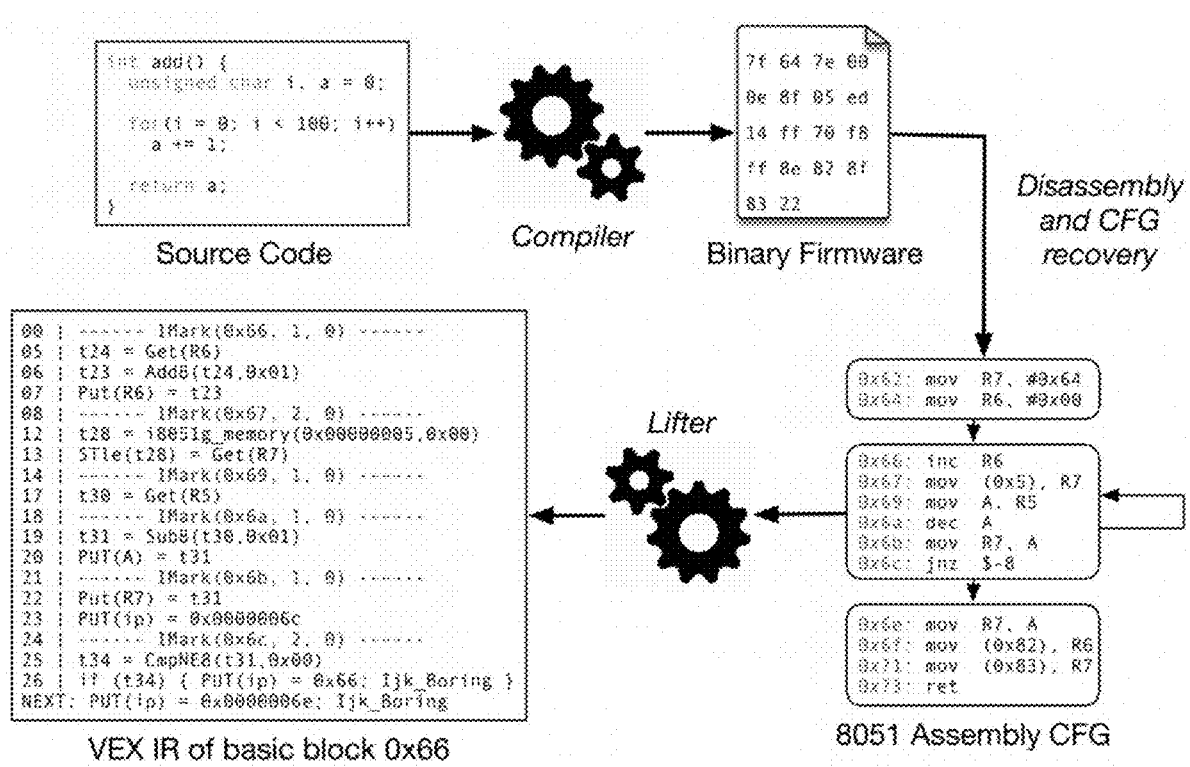
Figure 5:
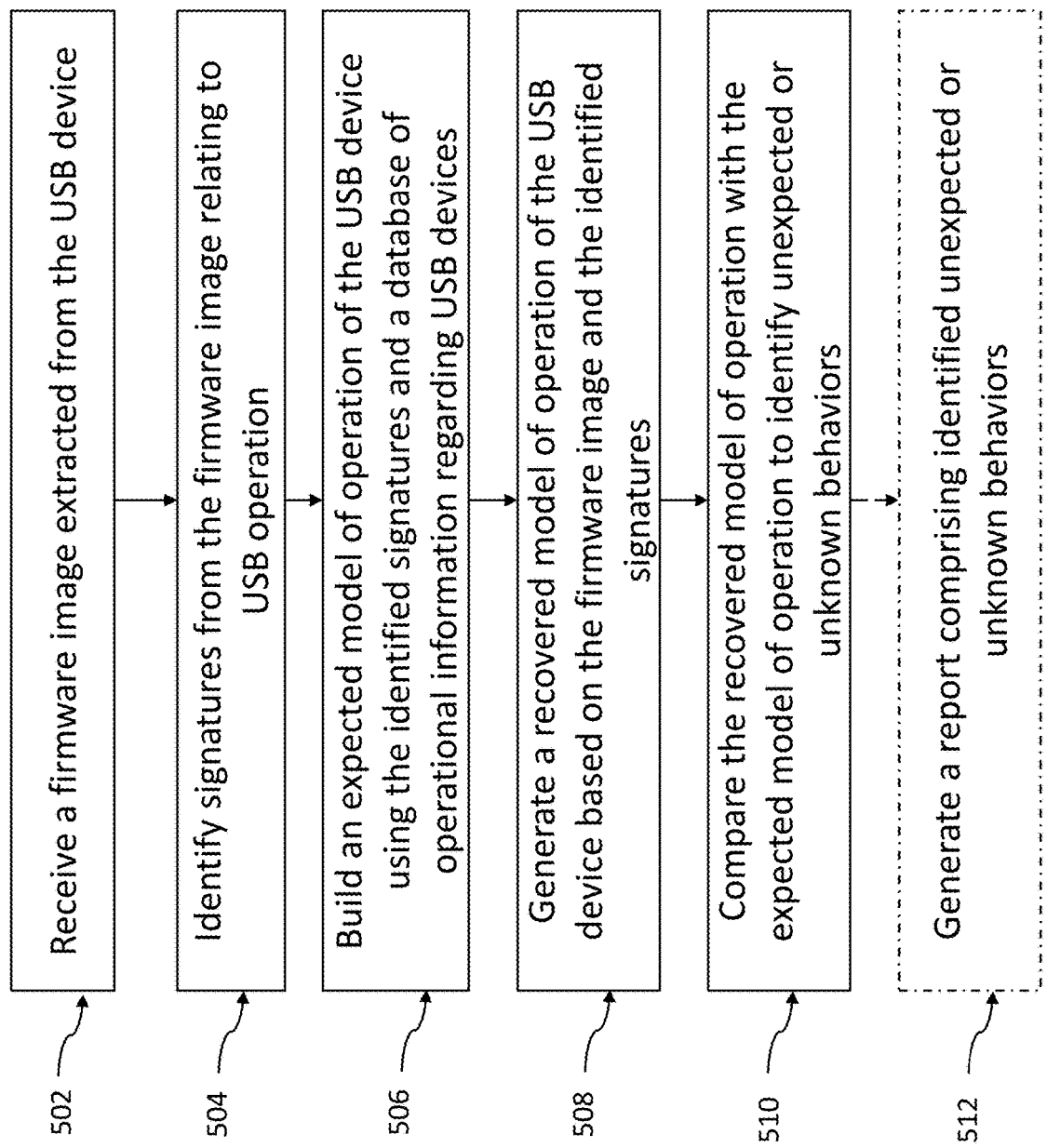
Figure 6:
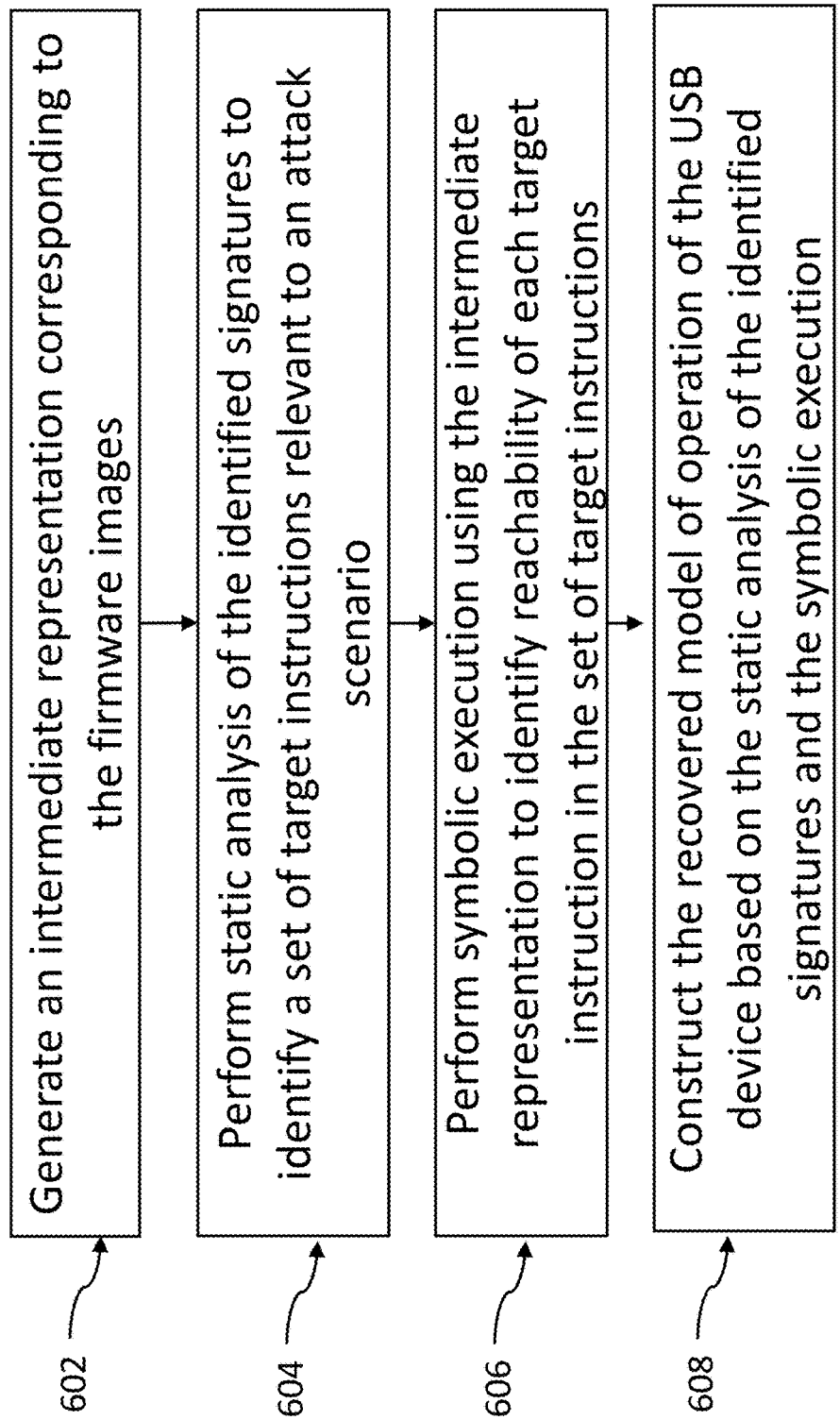
Figure 7B:
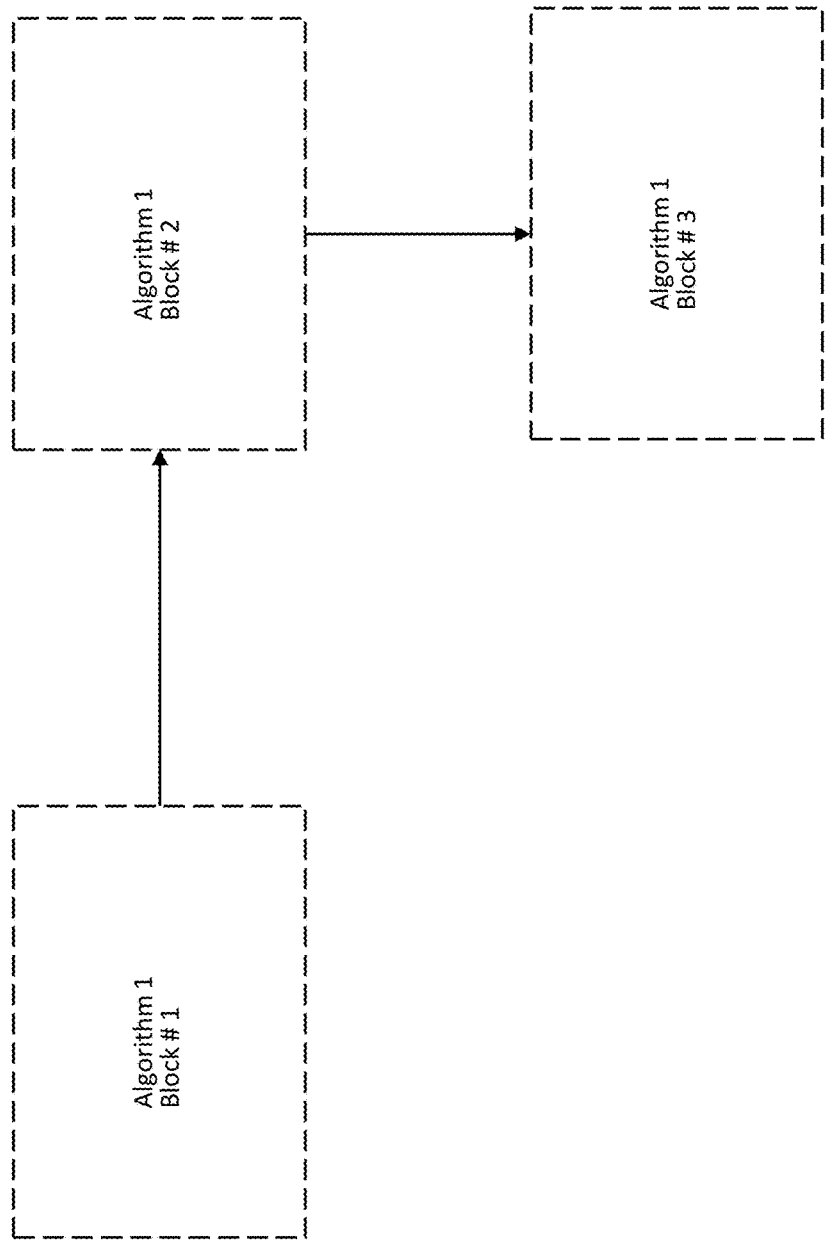
Figure 7C:
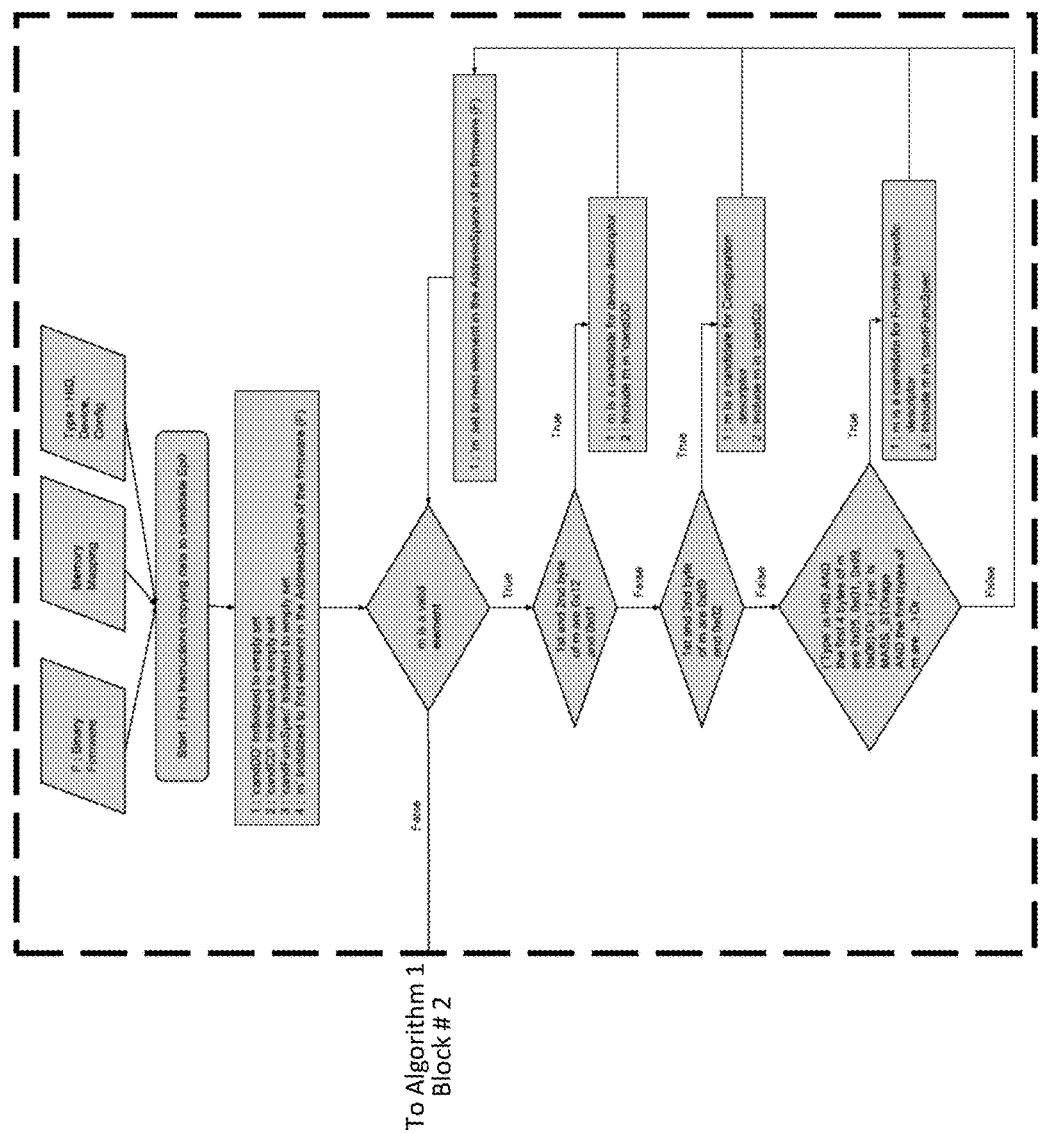
Figure 7D:
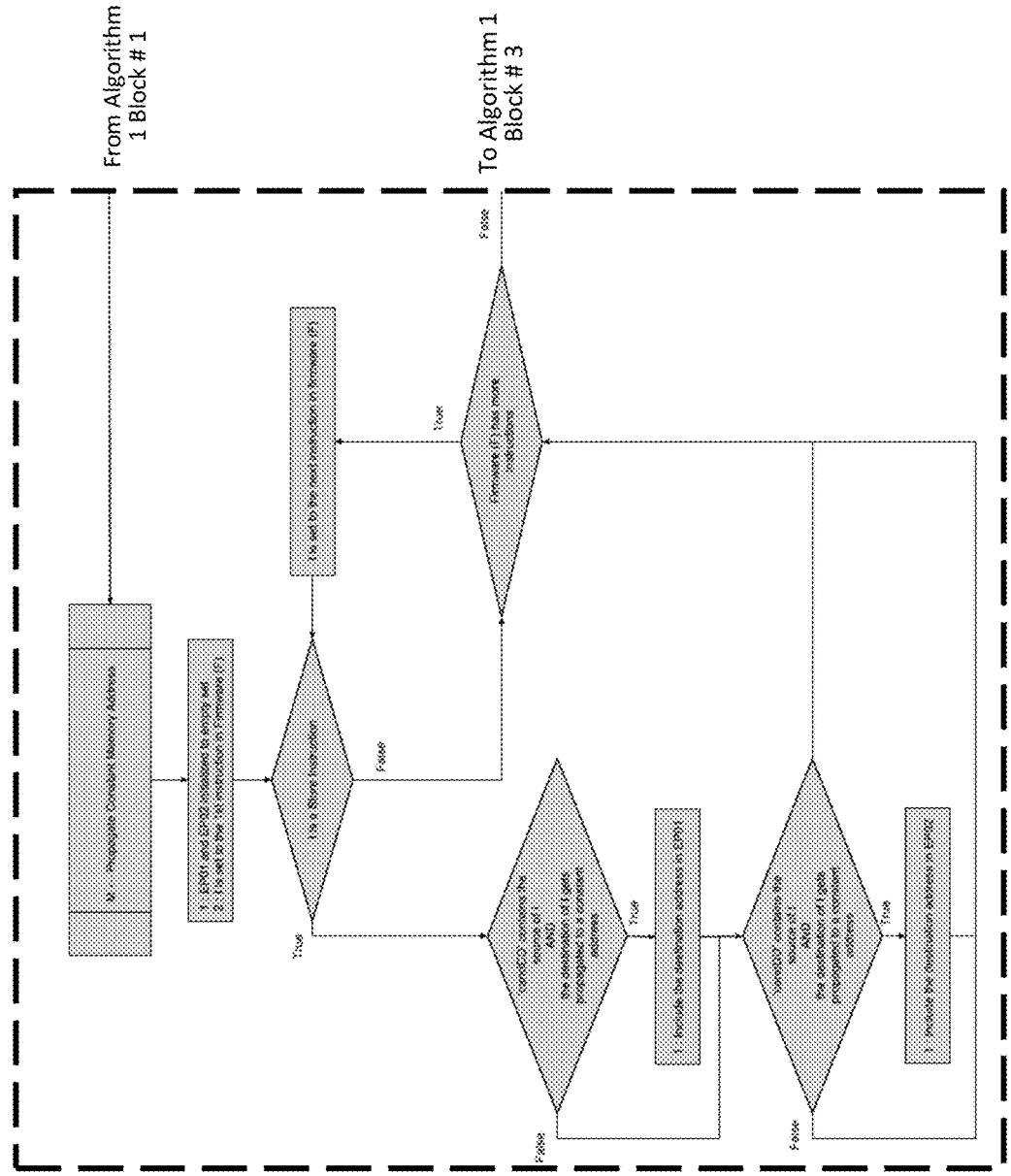
Figure 7E:
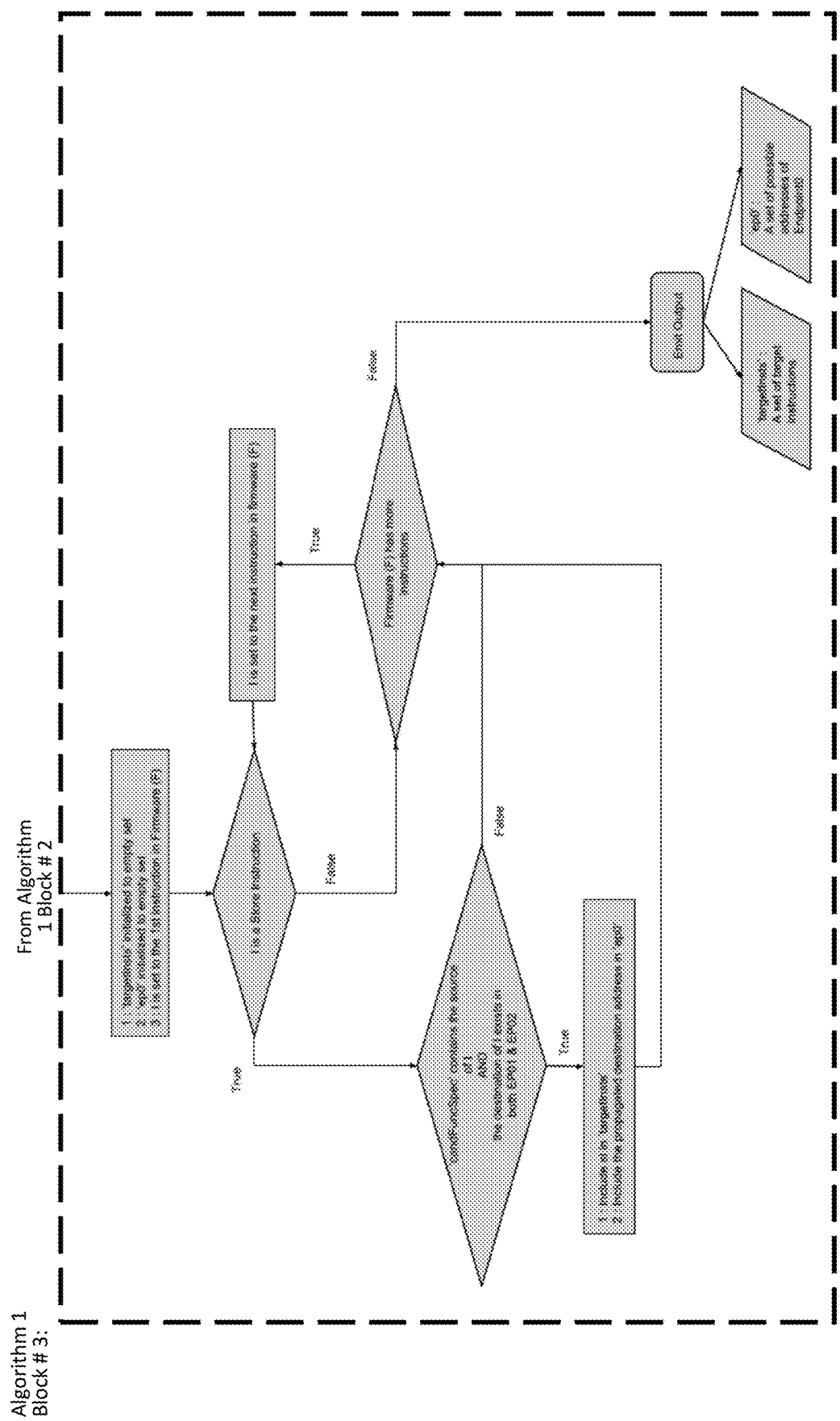
Figure 8B:
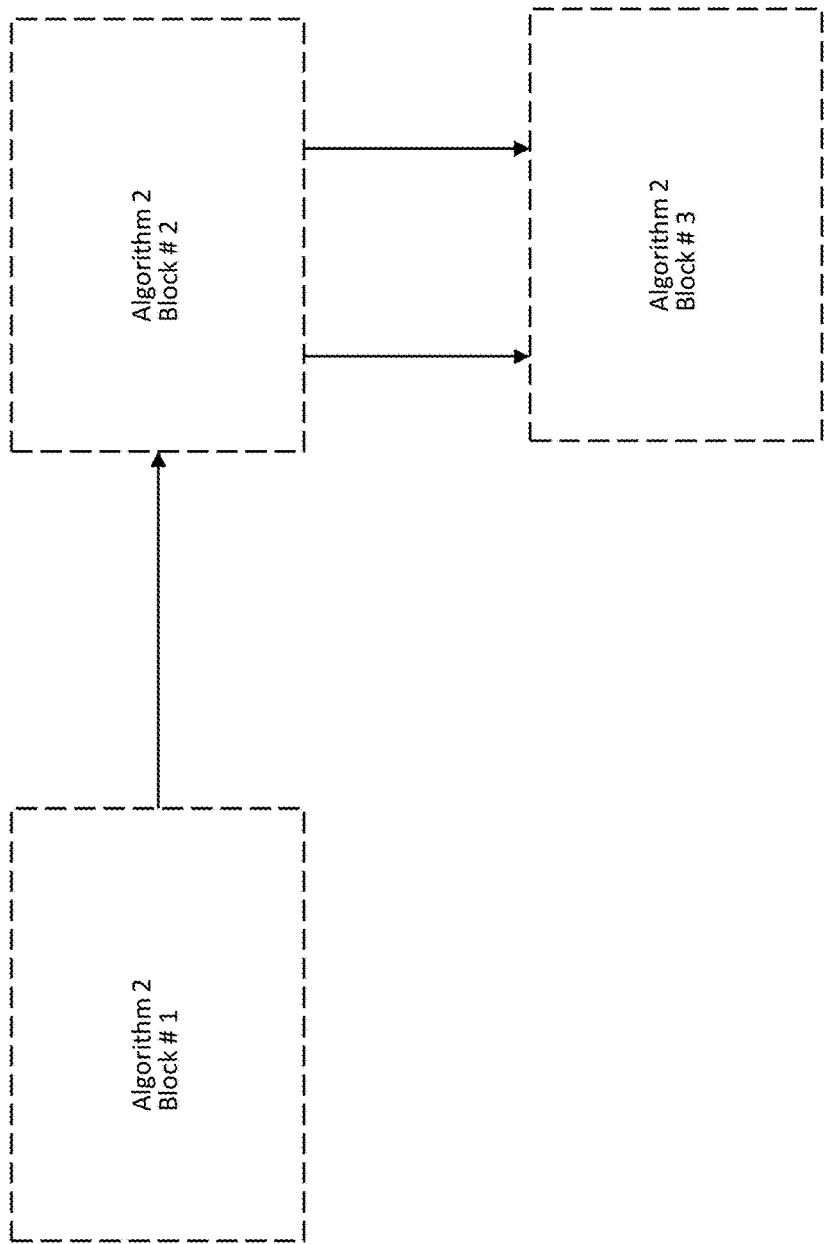
Figure 8C:
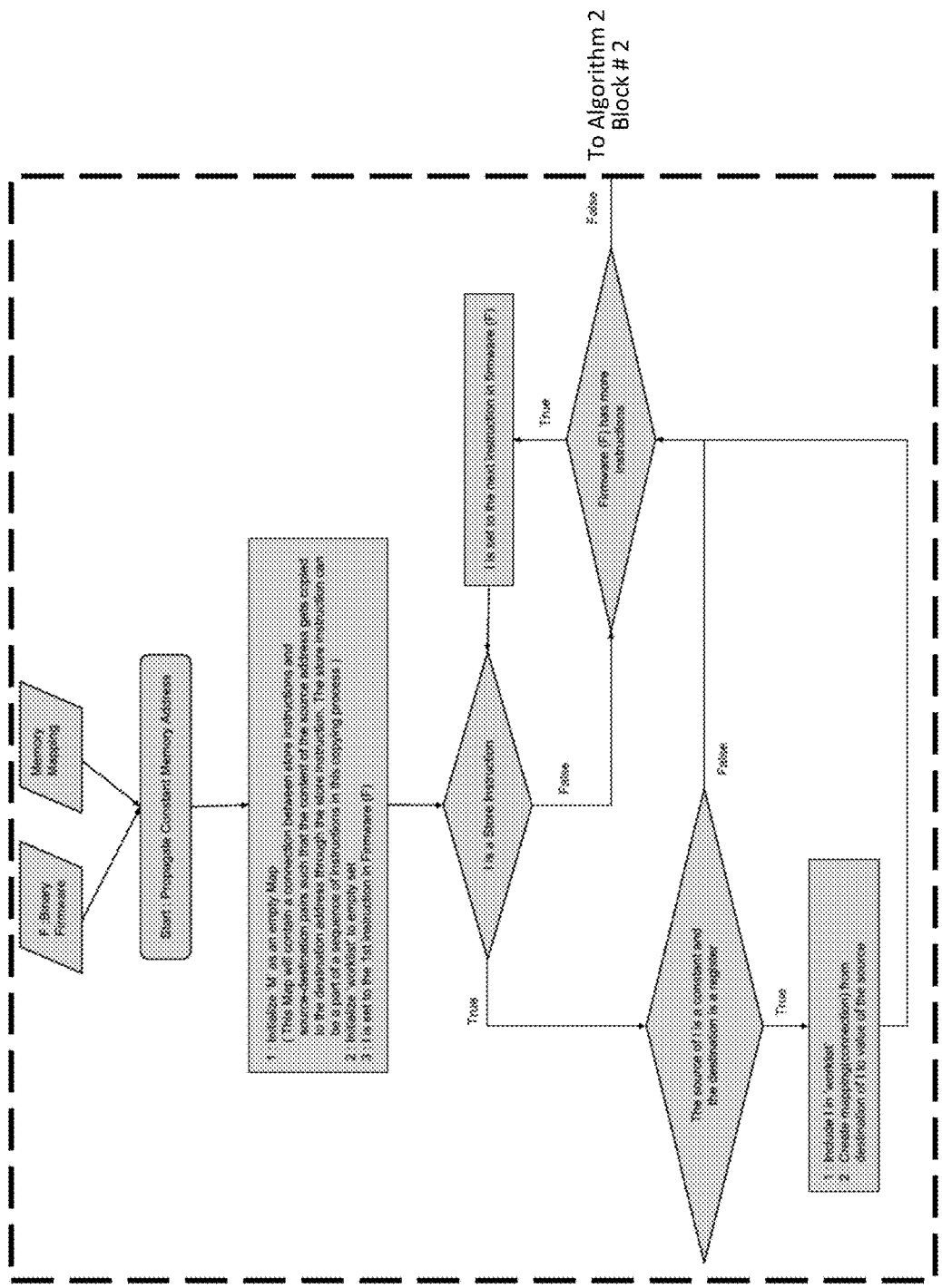
Figure 8D:
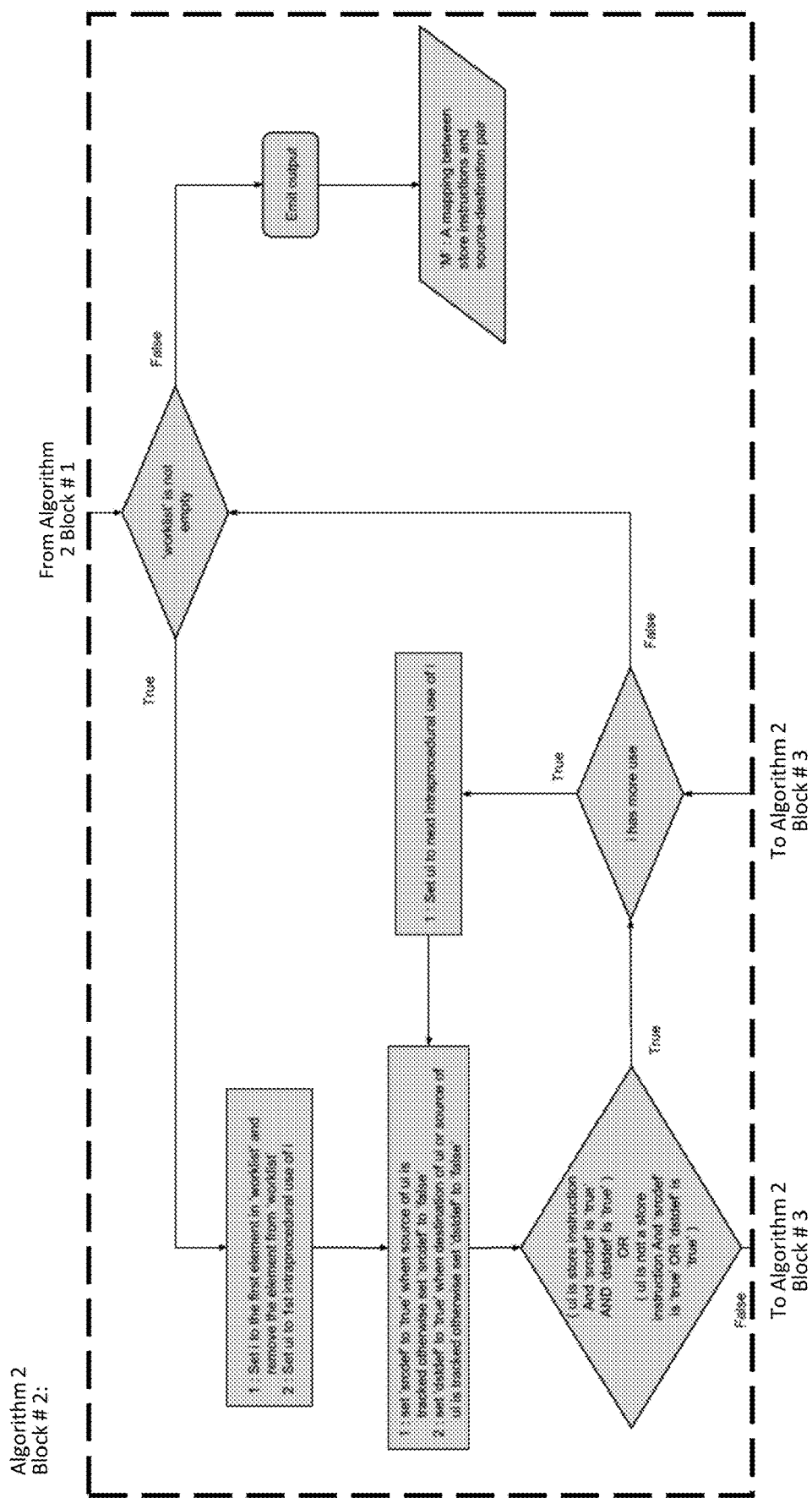
Figure 8E:
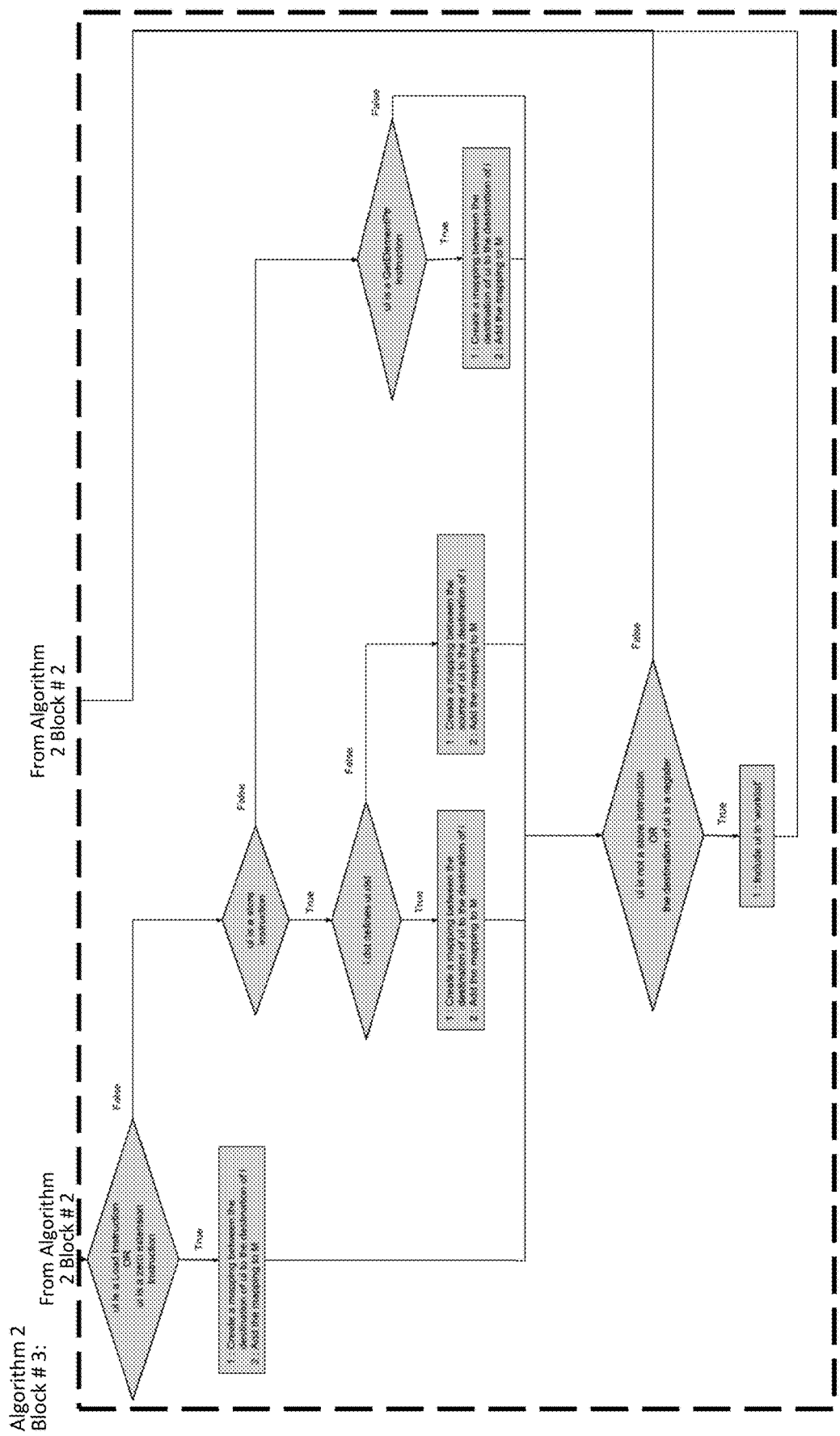
Figure 9B:
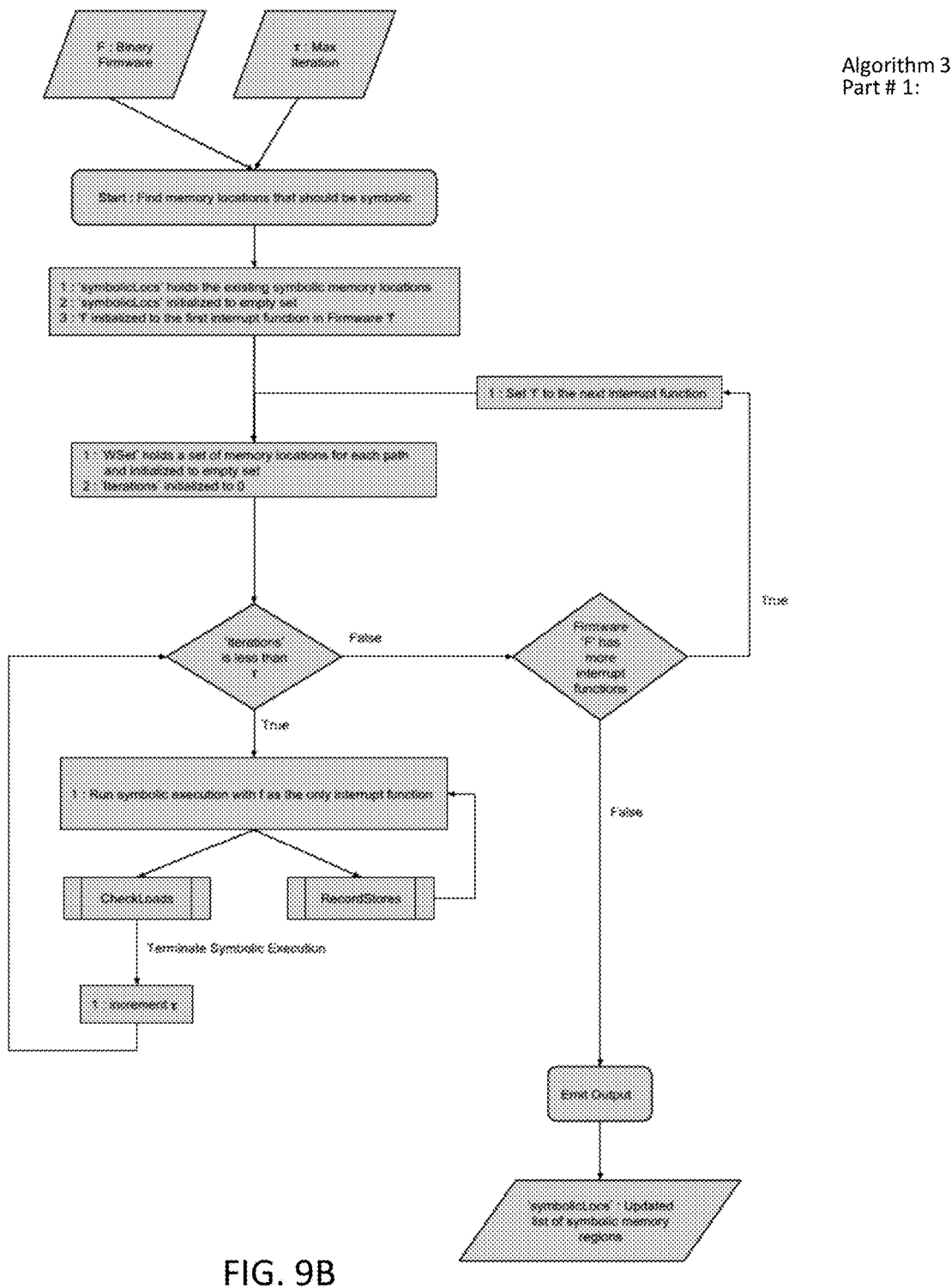
Figure 9C:
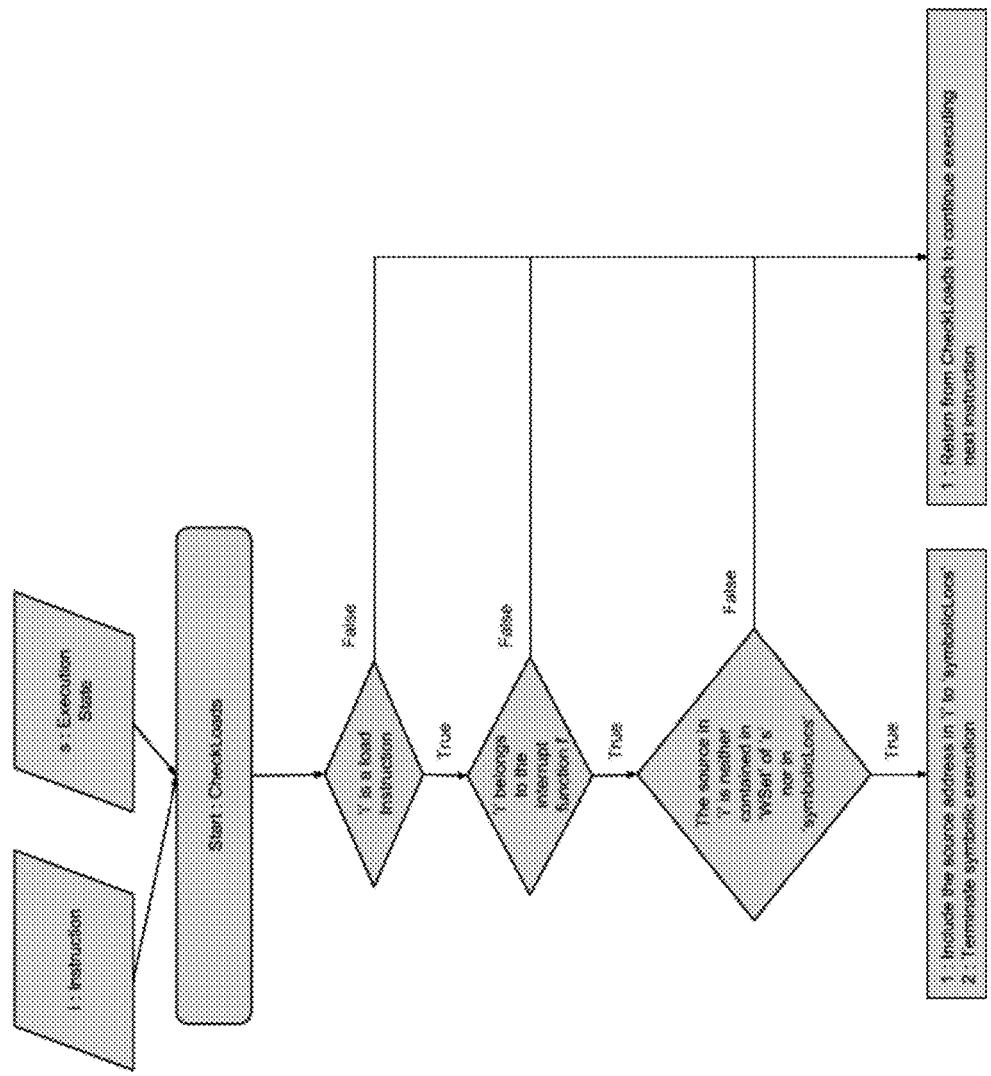
Figure 9D:
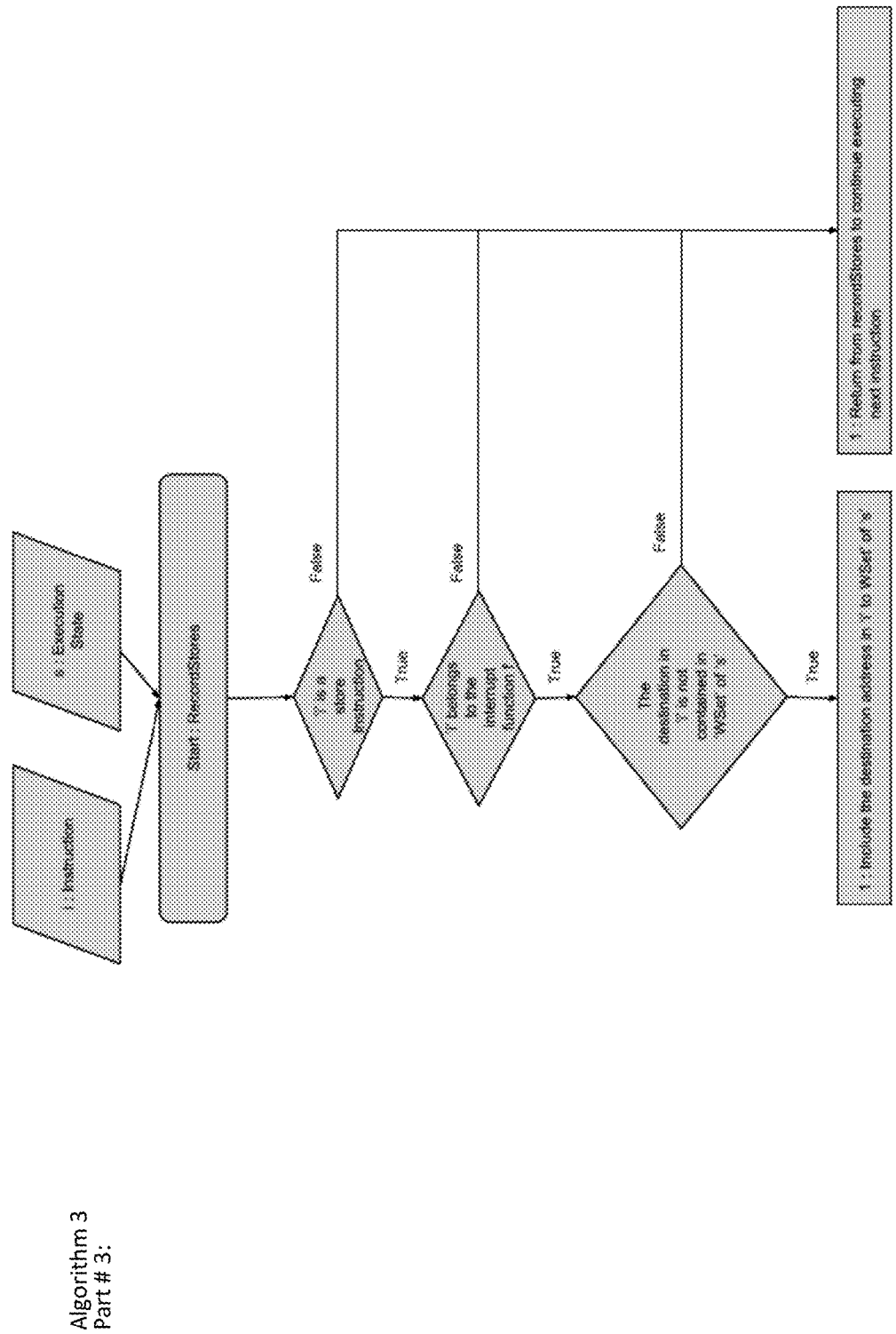
Figure 10B:
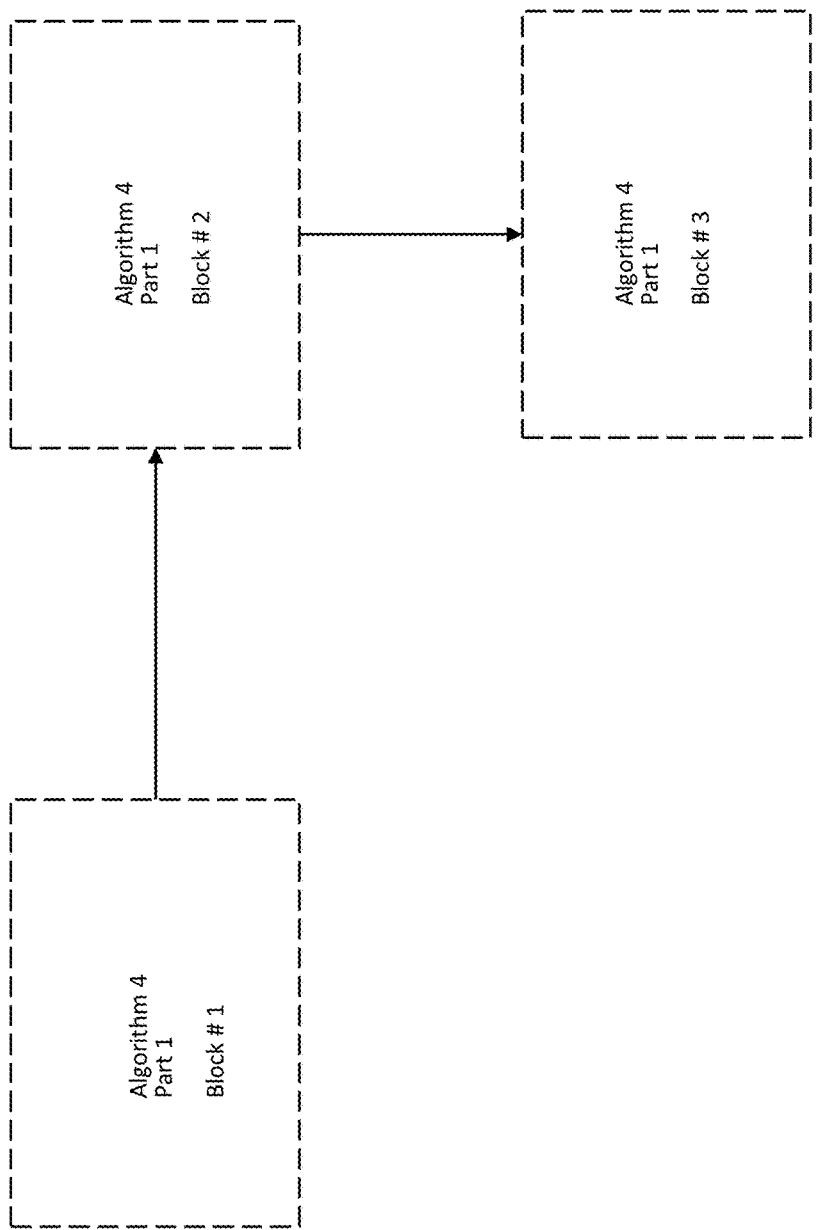
Figure 10C:
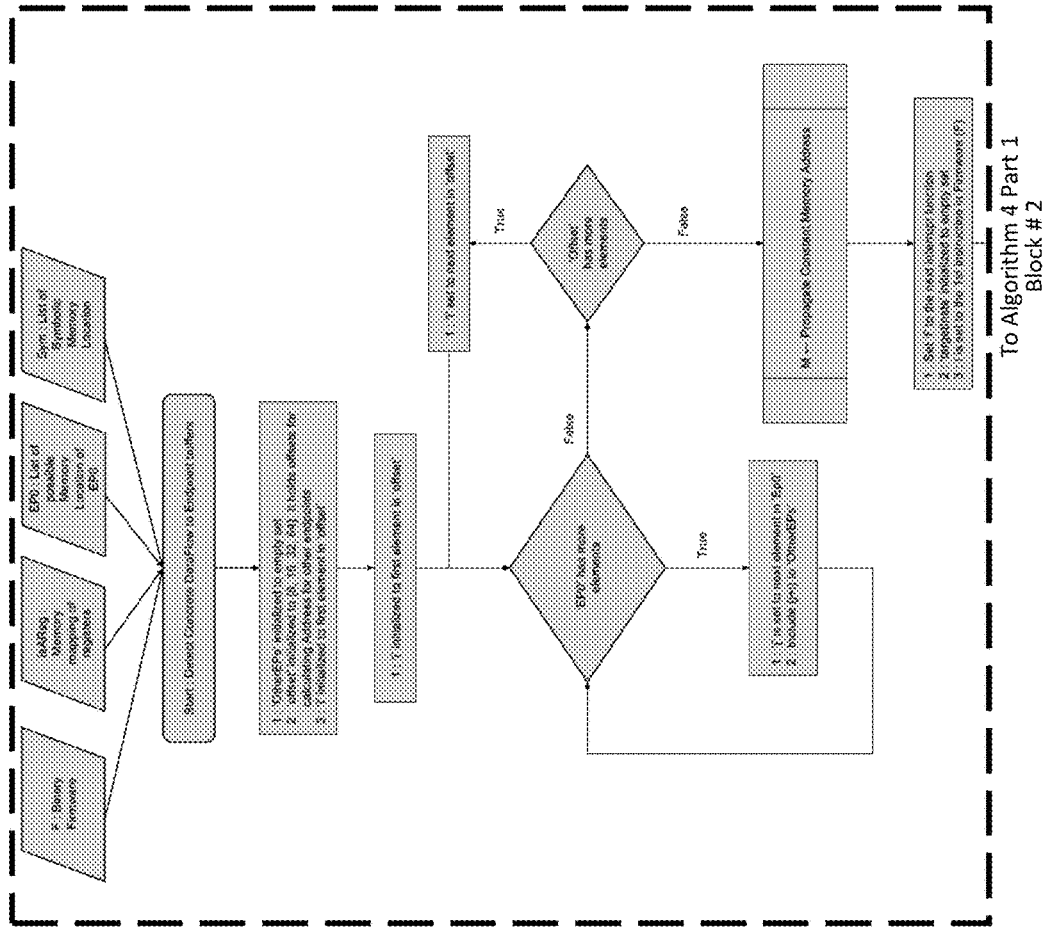
Figure 10D:
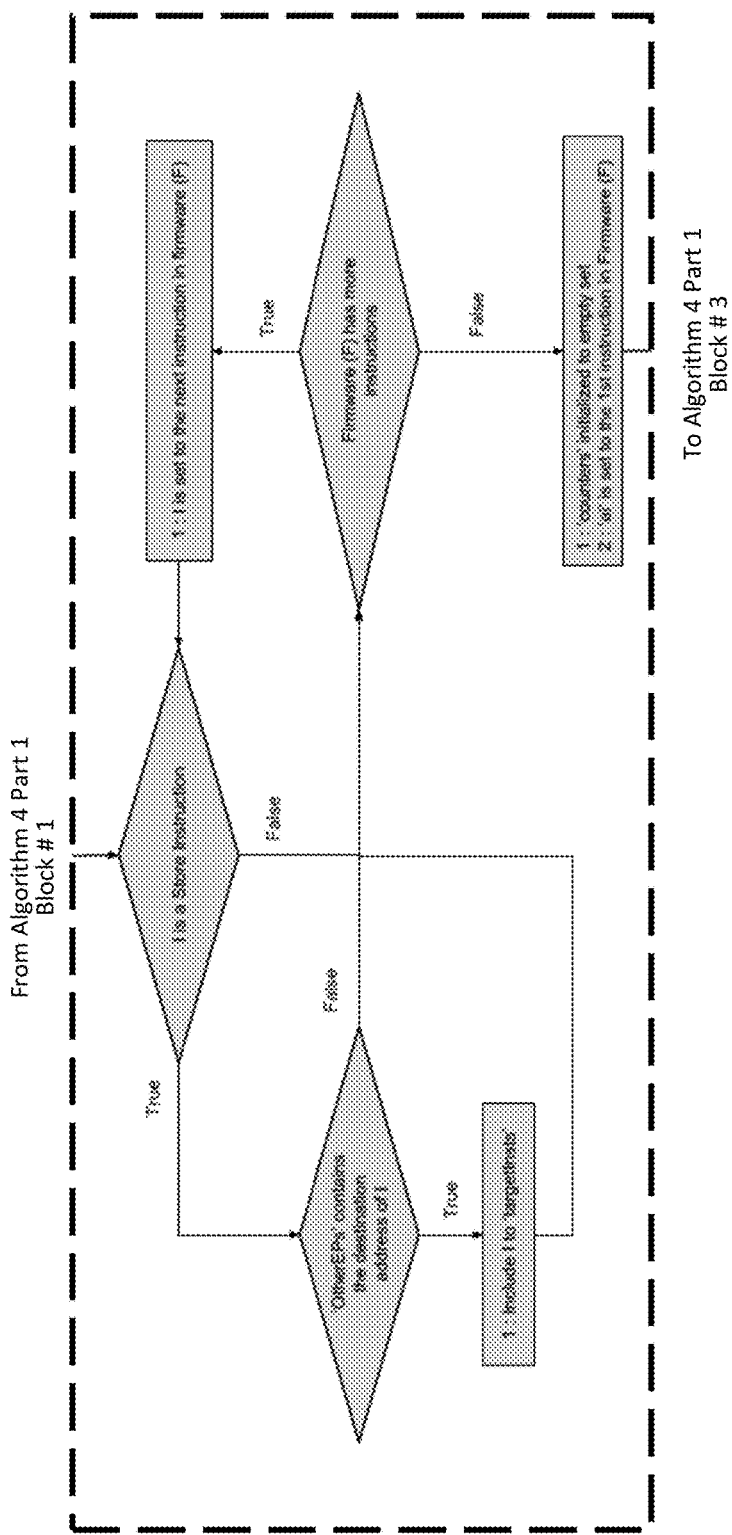
Figure 10E:
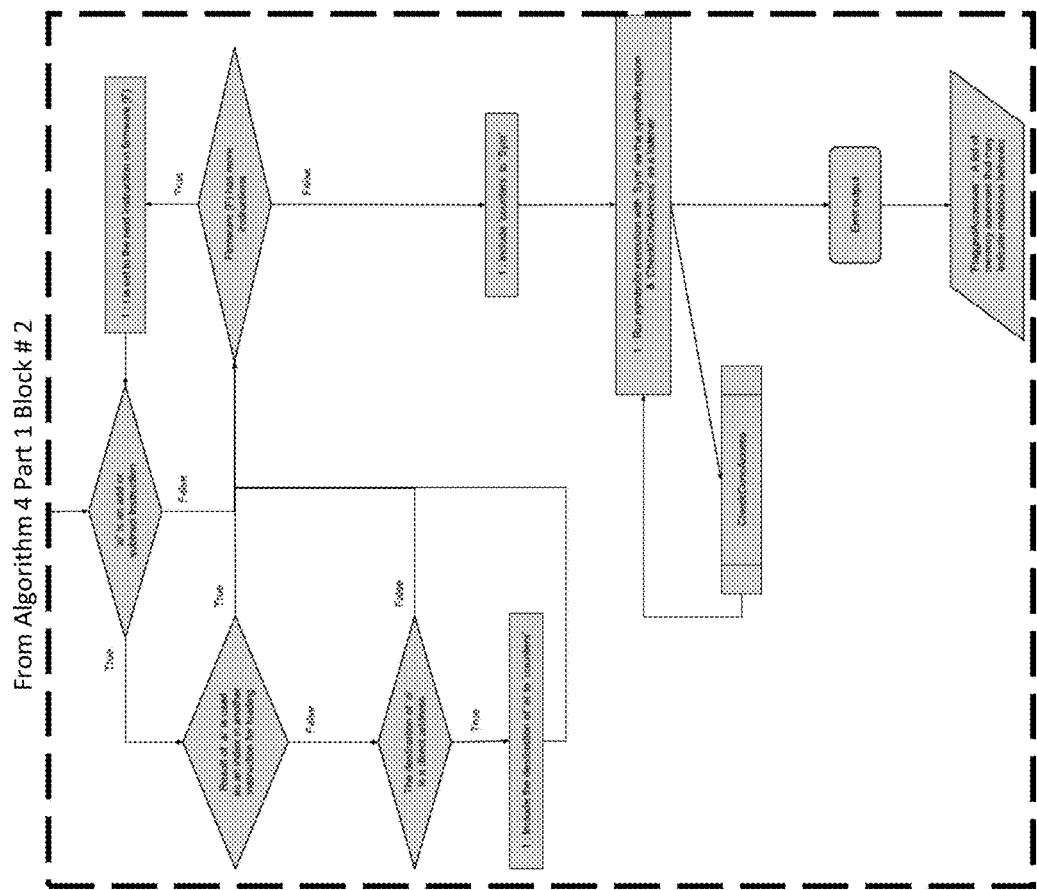
Figure 10F:
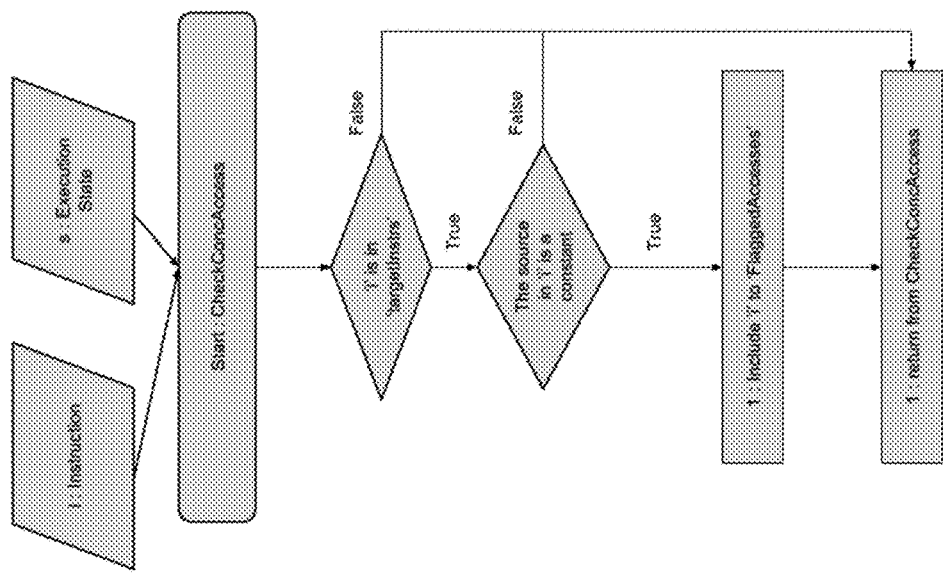
Figure 11B:
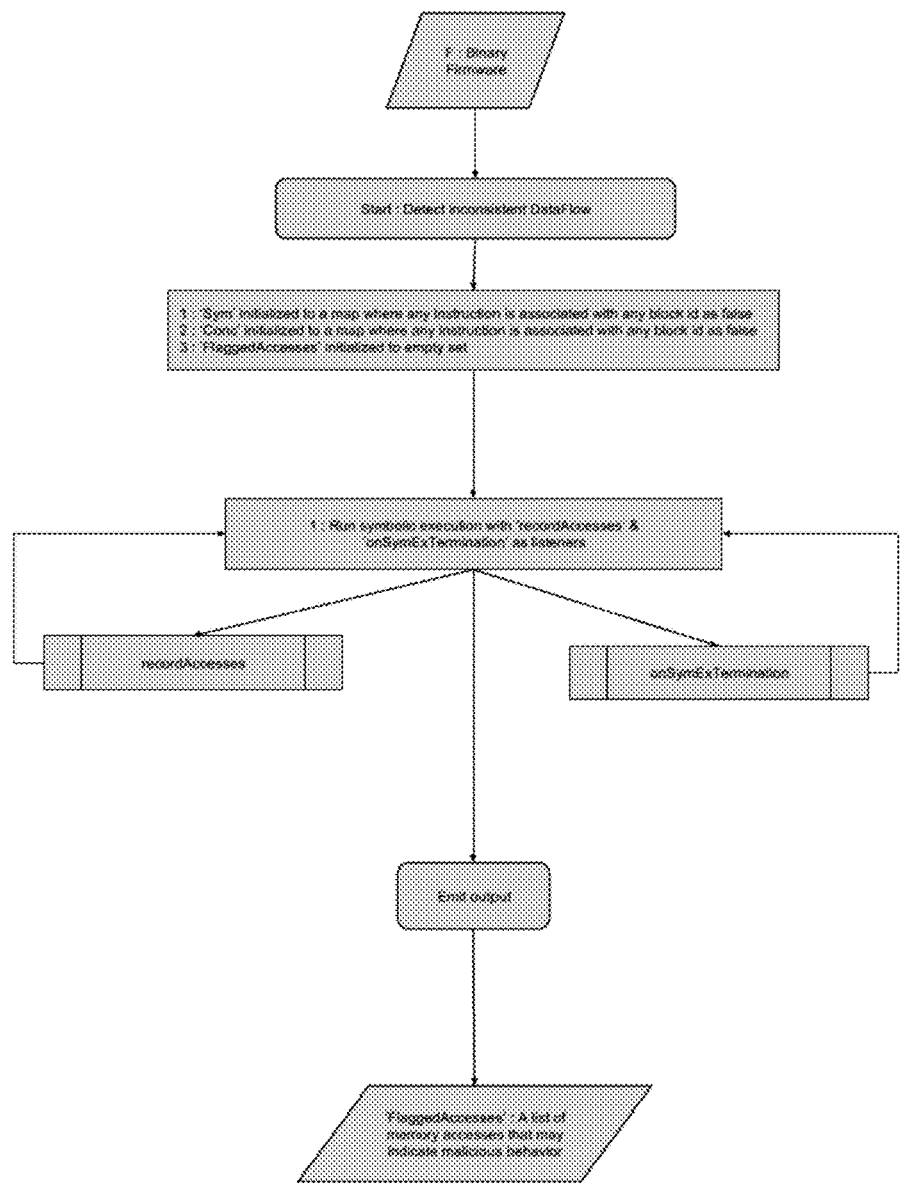
Figure 11C:
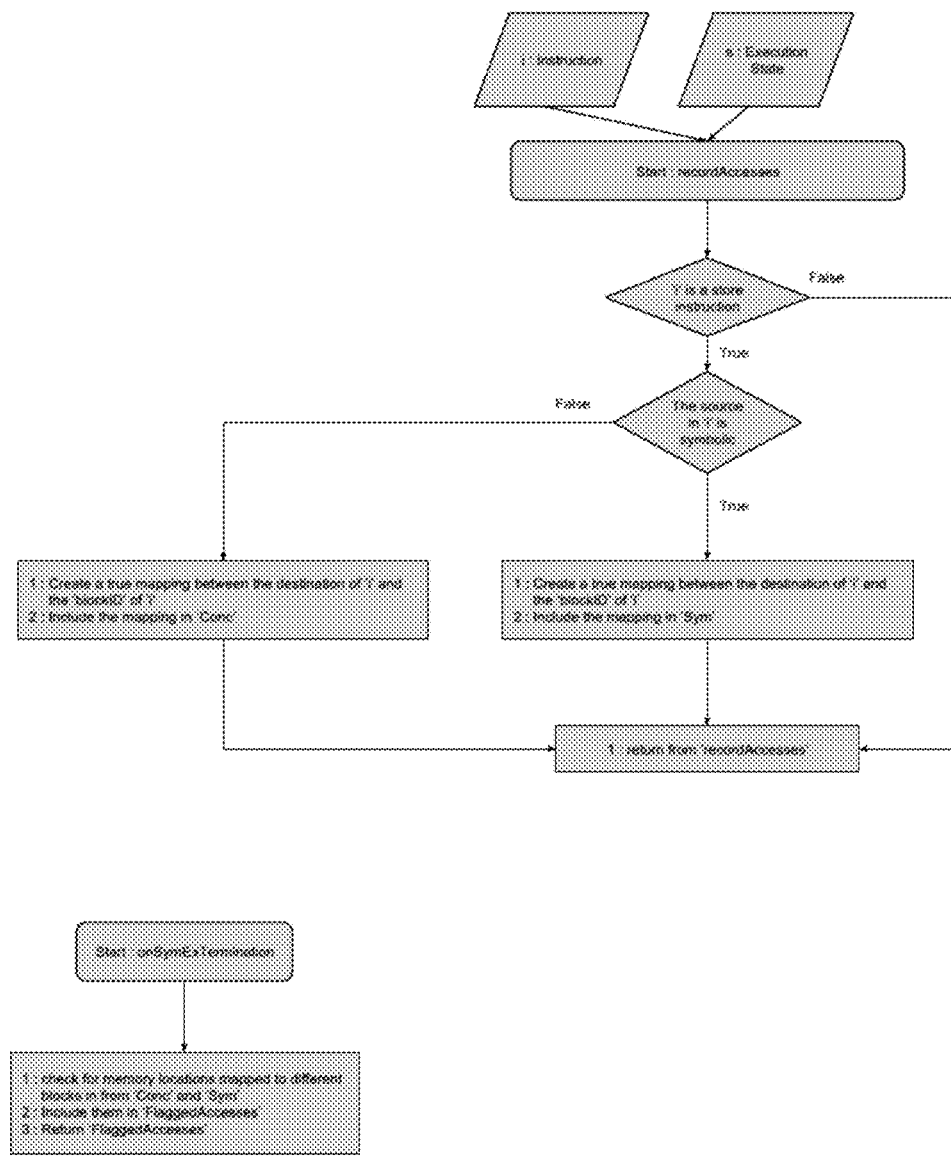

Having thus described the invention in general terms, reference will now be made to the accompanying drawings, which are not necessarily drawn to scale, and wherein:

FIG. 1 illustrates an overview of a system that can be used to practice embodiments of the present disclosure, in accordance with example embodiments described herein;

FIG. 2 illustrates an exemplary schematic diagram of a computing entity, in accordance with example embodiments described herein;

FIG. 3 illustrates a flowchart comprising a set of operations for vetting USB device firmware, in accordance with example embodiments described herein;

FIG. 4 illustrates an exemplary flowchart illustrating a set of operations that may be performed in an example embodiment for converting binary firmware to a corresponding IR;

FIG. 5 illustrates a flowchart comprising a set of operations for vetting USB device firmware, in accordance with example embodiments described herein;

FIG. 6 illustrates a flowchart comprising a set of operations for generating a recovered model of operation for a USB device, in accordance with example embodiments described herein;

FIG. 7A illustrates a set of operations that may be performed in an example embodiment for identifying candidate instructions that copy functionality/protocol specific information to an endpoint 0 (EP0) buffer;

FIG. 7B illustrates a set of operations that may be performed in an example embodiment for identifying candidate instructions that copy functionality/protocol specific information to an endpoint 0 (EP0) buffer;

FIG. 7C illustrates a set of operations that may be performed in an example embodiment for identifying candidate instructions that copy functionality/protocol specific information to an endpoint 0 (EP0) buffer;

FIG. 7D illustrates a set of operations that may be performed in an example embodiment for identifying candidate instructions that copy functionality/protocol specific information to an endpoint 0 (EP0) buffer;

FIG. 7E illustrates a set of operations that may be performed in an example embodiment for identifying candidate instructions that copy functionality/protocol specific information to an endpoint 0 (EP0) buffer;

FIG. 8A illustrates a set of operations for tracking data flow among memory locations, in accordance with example embodiments described herein;

FIG. 8B illustrates a set of operations for tracking data flow among memory locations, in accordance with example embodiments described herein;

FIG. 8C illustrates a set of operations for tracking data flow among memory locations, in accordance with example embodiments described herein;

FIG. 8D illustrates a set of operations for tracking data flow among memory locations, in accordance with example embodiments described herein;

FIG. 8E illustrates a set of operations for tracking data flow among memory locations, in accordance with example embodiments described herein;

FIG. 9A illustrates a set of operations for finding memory locations that should be represented symbolically, in accordance with example embodiments described herein;

FIG. 9B illustrates a set of operations for finding memory locations that should be represented symbolically, in accordance with example embodiments described herein;

FIG. 9C illustrates a set of operations for finding memory locations that should be represented symbolically, in accordance with example embodiments described herein;

FIG. 9D illustrates a set of operations for finding memory locations that should be represented symbolically, in accordance with example embodiments described herein;

FIG. 10A illustrates a set of operations for detecting concrete data flows to endpoint buffers, in accordance with example embodiments described herein;

FIG. 10B illustrates a set of operations for detecting concrete data flows to endpoint buffers, in accordance with example embodiments described herein;

FIG. 10C illustrates a set of operations for detecting concrete data flows to endpoint buffers, in accordance with example embodiments described herein;

FIG. 10D illustrates a set of operations for detecting concrete data flows to endpoint buffers, in accordance with example embodiments described herein;

FIG. 10E illustrates a set of operations for detecting concrete data flows to endpoint buffers, in accordance with example embodiments described herein;

FIG. 10F illustrates a set of operations for detecting concrete data flows to endpoint buffers, in accordance with example embodiments described herein;

FIG. 11A illustrates a set of operations for detecting inconsistent data flows, in accordance with example embodiments described herein;

FIG. 11B illustrates a set of operations for detecting inconsistent data flows, in accordance with example embodiments described herein;

FIG. 11C illustrates a set of operations for detecting inconsistent data flows, in accordance with example embodiments described herein;

FIG. 12 provides an example of code resulting from analyses according to embodiments of the present disclosure; and FIG. 13 illustrates exemplary path constraints associated with analyses according to embodiments of the present disclosure.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. OVERVIEW

The present embodiments address the aforementioned problems through the analysis of firmware underlying USB devices. The present embodiments comprise a framework that uses domain knowledge of the USB protocol to validate device firmware against expected functionality through symbolic execution. USB devices are often small and resource-constrained, with significantly different chip architectures than the ARM and x86 processors found on computers and smartphones. While substantial past work has focused on firmware analysis of these processor architectures, comparatively little has been done on the microcontrollers that embedded USB devices often employ. The present embodiments introduce architecture-specific support to existing frameworks and provide informed guidance through USB-specific knowledge to improve analysis. Embodiments present binary lifters to allow for symbolic analysis of the Intel 8051 MCU, which represents a Harvard architecture chip designed in 1980 that looks vastly different from modern processor designs, but is commonly used in USB flash drives as well as many other embedded environments. Two symbolic execution frameworks are used for exemplary analyses herein in order to better understand the benefits and challenges of different approaches when using uncommon instruction architectures.

Embodiments of the present disclosure use FIE, which uses LLVM as an Intermediate Representation (IR) and is built on top of the KLEE symbolic execution engine, as well as ANGR, which is designed to be used for binary analysis and employs Valgrind's VEX as an IR.

The present embodiments present a framework that is bottom-up, in that it does not rely on the existence of source code to perform its analysis. This is crucial for microcontroller firmware, for which source code may be difficult if not impossible to publicly find for many proprietary USB controllers. In embodiments (e.g., referred to herein at times as "FIRMUSB") static analysis and symbolic execution are used to extract the semantics of a firmware image in order to build a model of discovered firmware functionality for comparison to expected functionality.

Contributions provided by the present disclosure are summarized as follows:
 Firmware Analysis Framework: A USB-specific firmware analysis framework is provided to verify or determine the intention of compiled USB controller firmware binaries running on the 8051/52 architectures. To the knowledge of the inventors, the present disclosure provides the first 8051 lifter into the popular VEX and LLVM IRs.
 Domain-Informed Targeting: The present disclosure enables detection of malicious activity in Phison firmware images for flash drive controllers containing BadUSB, as well as EzHID HID firmware images for 8051 containing malicious activity. For the malicious Phison image, the present domain-specific approach speeds up targeting by a factor of 7 compared to unconstrained fully symbolic execution.
 Analysis of Existing Symbolic Frameworks: Insights regarding and description of the challenges of utilizing existing tools to analyze binary firmware for embedded systems architectures are described herein, and guidance is presented herein on how such tools can be improved to deal with these architectures.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 provides an illustration of an exemplary embodiment of the present invention. As shown in FIG. 1, this particular embodiment may include one or more diagnostic computing entities 10, one or more USB devices 20, one or more information/data computing entities 30, one or more networks 40, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture. For instance, not all embodiments will require a separate information/data computing entity 30, and not all embodiments will require a connection to a network 40.

1. Exemplary Diagnostic Computing Entity

FIG. 2 provides a schematic of a diagnostic computing entity 10 according to one embodiment of the present disclosure. In example embodiments, a diagnostic computing entity 10 may be configured to construct and apply a USB vetting framework for evaluation of the firmware of a USB device. The diagnostic computing entity 10 may comprise any of the components described herein with respect to FIG. 2 (and, of course, may include additional components that are unrelated to the operations described herein).

In general, the terms computing entity, computer, entity, device, system, and/or similar words used herein interchangeably may refer to, for example, one or more computers, computing entities, desktops, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the diagnostic computing entity 10 may also include one or more communications interfaces 120 for communicating with various other computing entities, such as by communicating data, content, information, and/or similar terms used herein interchangeably that can be transmitted, received, operated on, processed, displayed, stored, and/or the like.

As shown in FIG. 1, in one embodiment, the diagnostic computing entity 10 may include or be in communication with one or more processing elements 105 (also referred to as processors, processing circuitry, and/or similar terms used herein interchangeably) that communicate with other elements within the diagnostic computing entity 10 via a bus, for example. As will be understood, the processing element 105 may be embodied in a number of different ways. For example, the processing element 105 may be embodied as one or more complex programmable logic devices (CPLDs), microprocessors, multi-core processors, co-processing entities, application-specific instruction-set processors (ASIPs), microcontrollers, and/or controllers. Further, the processing element 105 may be embodied as one or more other processing devices or circuitry. The term circuitry may refer to an entirely hardware embodiment or a combination of hardware and computer program products. Thus, the processing element 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 105 may be configured for a particular use or configured to execute instructions stored in volatile or non-volatile media or otherwise accessible to the processing element 105. As such, whether configured by hardware or computer program products, or by a combination thereof, the processing element 105 may be capable of performing steps or operations according to embodiments of the present disclosure when configured accordingly.

In one embodiment, the diagnostic computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 110, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the diagnostic computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 115, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 105. Thus, the databases, database instances, database management systems, data, applications, programs, program modules, scripts, source code, object code, byte code, compiled code, interpreted code, machine code, executable instructions, and/or the like may be used to control certain aspects of the operation of the diagnostic computing entity 10 with the assistance of the processing element 105 and operating system.

As indicated, in one embodiment, the diagnostic computing entity 10 may also include one or more communications interfaces 120 for communicating with various other computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the diagnostic computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

As will be appreciated, one or more of the components of the diagnostic computing entity may be located remotely from other components of the diagnostic computing entity 10, such as in a distributed system. Furthermore, one or more of these components may be combined with additional components to perform various functions described herein, and these additional components may also be included in the diagnostic computing entity 10. Thus, the diagnostic computing entity 10 can be adapted to accommodate a variety of needs and circumstances. As will be recognized, these architectures and descriptions are provided for exemplary purposes only and are not limiting to the various embodiments.

2. Exemplary User Computing Entity

In various embodiments, a USB device 20 may be configured to exchange and/or store information/data with the diagnostic computing entity 10. For instance, the USB device 20 may be designed for various purposes and may provide various types of added functionality to the diagnostic computing entity 10. In the various embodiments shown in FIG. 1, the USB device 20 may comprise an image capturing device i.e., a camera, storage device, keyboard, media player, smartphone, or the like, and may enable the diagnostic computing entity 10 to communicate with and possibly utilize the corresponding functionality of such devices when connected to the diagnostic computing entity 10.

Each USB device 20 may include one or more components that are functionally similar to those of the diagnostic computing entity 10 described above. For example, in one embodiment, each USB device 20 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces.

3. Exemplary Information/Data Computing Entity

In various embodiments, the information/data computing entity 30 may be configured to receive, store, and/or provide information/data regarding USB devices 20, and/or other information/data that may be requested by any of a variety of computing entities. For instance, the information/data computing entity 30 may comprise a database of operational information regarding expected USB functionality that may be queried to produce one or more expected model of operation of a USB device 20 based on signatures retrieved from firmware images of the USB device 20. In another embodiment (not shown in FIG. 1), the information/data computing entity 30 may be directly connected via a USB port to one or more USB devices 20, and may transmit information regarding its connected USB devices 20 to the diagnostic computing entity 10 for analysis.

In one embodiment, an information/data computing entity 30 may include one or more components that are functionally similar to those of the diagnostic computing entity 10, USB device 20, and/or the like. For example, in one embodiment, each information/data computing entity 30 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces. Finally, it should be understood that although information/data computing entity 30 is illustrated as a separate device from the diagnostic computing entity 10, this is done for ease of illustration only. In some embodiments, the information/data computing entity 30 may be a component of the diagnostic computing entity 10.

IV. ADDITIONAL BACKGROUND

1. Universal Serial Bus

The USB protocol provides a foundation for host-peripheral communications and is a ubiquitous interface. USB is a host-master protocol, which means that the host initiates all communication on the underlying bus (USB OTG and USB 3.0 are the exceptions. While USB 3.0 and later devices allow for device-initiated communication, such a paradigm is still relatively rare amongst peripherals, which are overwhelmingly designed to respond to host queries). This is true even for interrupt driven devices such as keyboards. The underlying bus arbitration and low-level bit stream are handled in dedicated hardware for speed and reliability. The present disclosure focuses on the device level configuration and omit the study of lower-level aspects of USB (i.e., power management, speed negotiation, timing).

When a USB device is first plugged into a host machine, it undergoes the process of enumeration. A device possesses a set of descriptors including device, configuration, interface, and endpoint descriptors. A device descriptor contains the vendor (VID) and product (PID) identifiers, pointers to string descriptors, and device class and protocol. VIDs are assigned to the vendor by the USB Implementor's Forum (USB-IF). Vendors are then able to assign arbitrary PIDs to their products. VIDs and PIDs should be unique but are not required to be. The device class (bDeviceClass) and its defined protocol (bDeviceProtocol) hint to the host what capabilities to expect from the device. The last field in the device descriptor is the number of configurations (bNumConfigurations). A USB device may have multiple configuration descriptors, but only one may be active at a time. This high level descriptor describes the number of interfaces and power characteristics. Interface descriptors have a specific interface class and subclass. This defines the expected command set to the host operating system. The final descriptor of interest is the endpoint descriptor. Endpoints are essentially mail boxes that have a direction (in and out), transfer type (control, isochronous, bulk, or interrupt), poll rate, and maximum packet size. By default, devices' first endpoint (Endpoint0 or EP0) respond to control transfers, which are mainly configuration details and commands from and to the host machine. Other endpoints may be used for pure data transfer.

Two device classes discussed herein include the Human Interface Device (HID) (0x03h) and the Mass Storage (0x08h) classes. Devices are free to have mixed-class interfaces, which means they are considered to be composite devices. For example, a physical flash drive could contain two interfaces—one mass storage and the other HID. This would allow it to transfer and store bulk data while possibly acting as a keyboard on the host machine. Additionally, a device could at runtime switch configurations from a pure mass storage device to a HID device.

The elements of the USB protocol that are implemented in hardware and firmware varies based on the specific USB controller. For instance, some USB devices may be completely fixed in hardware, meaning that their configuration descriptors, including their vendor and product IDs, are static. In various embodiments and analyses presented herein, it is assumed that the firmware deals with all of the major descriptors and the hardware provides low-level USB signaling.

USB Attacks. Exploits on the USB protocol and implementations of it (e.g., on hosts, peripherals, and controllers) may occur from the physical layer upwards. An example of a physical layer attack could be a malicious USB device that destroys the bus by using out-of-specification voltages and currents via large capacitors. An example of a more subtle attack is a "BadUSB" attack. The "BadUSB" attack acts completely within the USB protocol and abuses the trust of users and the lack of USB device authenticity. During the USB enumeration phase, the USB host will query the device in order to discover its functionality via descriptors (e.g., keyboard, storage, webcam, etc.), but a BadUSB device will misrepresent itself as an unlikely device type. In concrete terms, a flash drive could claim itself as a keyboard or network device without consequence. This mismatch between physical device and presentation of capabilities could be used to socially engineer users who would trust a keyboard differently than a flash drive (e.g., not anticipating keystrokes from their flash drive).

What actually constitutes a malicious or misrepresenting USB device is simply a malicious application of the USB protocol. This application which, depending on the device, runs on hardware, a microcontroller, a CPU, or any combination of these, determines how a device functions when exposed to the USB protocol. The present disclosure addresses the software that runs on USB microcontrollers, in particular microcontrollers that utilize the 8051 architecture.

2. Firmware Analysis

Microcontroller devices are often overlooked, but with the explosion of embedded and IoT devices, these are becoming woven into the fabric of modern day society. It is thus vital to have methods for demonstrating their trustworthiness. USB devices represent one of many classes of devices that run firmware, but are particularly interesting to study, both due to the widespread deployment of existing devices, and because in newer computers, many interfaces are being replaced with USB-C connections to provide all peripheral functionality. While the physical signal characteristics may differ between USB connection types and protocol versions, the same security issues (e.g., the USB-IF states that users are responsible the security of USB devices) remain present in all devices.

8051 Architecture. The Intel MCS-51, also known as the 8051, was developed by Intel Corporation in 1980 for use in embedded systems. Despite the 8051 being nearly 40 years old, it remains a popular design due to its reliability, simplicity, and low cost, and can be purchased in lightweight microcontrollers or embedded into FPGA/ASIC designs via an IP core. The 8051 is an 8-bit microcontroller based on a Harvard architecture and contains four major memory spaces: code, on-board memory (RAM), external RAM (XRAM), and Special Function Registers (SFRs). The 8051 contains 128 bytes of RAM and its extended variant, the 8052, contains 256 bytes and additional SFRs and timers. The 8052 has no instruction set differences from the 8051. This microcontroller has 32 registers spread across four memory-mapped banks and many SFRs for controlling the processor's peripherals. The notable SFRs are PSW, which controls the register banks and contains the carry flag, and the IE register, which controls interrupt functionality.

Intermediate Representation. In order to analyze firmware, machine code needs to be translated, or lifted, into an architecture-independent representation. An Intermediate Representation (IR) aims to be semantically equivalent to the underlying machine code, while being generic enough to support many different instruction operations across many architectures. There are many existing IRs in use today, with each having a specific focus and purpose. Therefore, an important design choice in binary analysis is the IR to use. By supporting a single unified IR, the footprint of the supporting analysis is smaller and possibly simpler. The alternative would be to have an architecture-specific engine, but this approach would require a rewrite of the engine and all of the analyses built upon it when targeting a new architecture.

Two notable intermediate representations are LLVM and VEX IR. The former is used by the LLVM compiler framework while the latter is used by the Valgrind dynamic analysis framework. A major difference between the IRs is that LLVM is meant for compilation (top-down) while VEX lifts machine code (bottom-up) and then drops back down after instrumentation. Both IRs support a variety of architectures and are supported by symbolic execution engines (FIE and ANGR respectively). However, to the knowledge of the inventors, prior to the present embodiments neither LLVM nor VEX had any support for the 8051 ISA.

Symbolic Execution. Symbolic execution is a program analysis technique that represents input values (e.g., registers or memory addresses) as variables that may hold any value. As a program is executed, symbolic values are propagated as a side effect of updates. Symbolic constraints encountered in conditional branch instructions are accumulated in what is called a path condition. When a conditional branch instruction is evaluated, the decision whether to take a specific branch is determined by the satisfiability of the path condition in conjunction with the symbolic constraints of the branch condition. For each feasible branch, a clone of the current execution state is created and the path condition is updated with the symbolic branch condition.

Symbolic execution engines suffer from the path explosion problem as the number of paths to be considered is exponential in the number of branches considered. Therefore, state-of-the art symbolic execution engines come with a variety of path exploration strategies such as random selection and coverage-based progress. Although symbolic execution has emerged as an effective white-box testing technique, certain embodiments use it to determine reachability of states that can aid in understanding various characteristics of a USB device.

V. EXEMPLARY SYSTEM OPERATION

Example embodiments of the present disclosure address problems created by the historically unconstrained functionality afforded to USB devices. As mentioned above, example embodiments construct and apply a USB vetting framework to evaluate USB device firmware. Example embodiments vet a USB firmware image by generating a recovered model of operation and comparing it with an expected model of operation for the firmware image to identify unexpected or unknown behaviors.

Example embodiments of the present disclosure comprise an extensible framework for execution and semantic analysis of firmware images. Example embodiments act as a semantic query engine via a combination of static and symbolic analysis. Unlike other solutions that rely on a device's actions or on human interaction to determine its trustworthiness, example embodiments of the present disclosure examine the device firmware to determine its capability for generating potentially malicious behavior. In general, determining if a device is malicious or benign via its firmware is a difficult task because of the many different device architectures and operating environments. As a result, example embodiments of the present disclosure aid in the analysis of binary USB controller firmware.

Example embodiments of the present disclosure synthesize multiple techniques to effectively reason about USB firmware. A symbolic execution engine allows binary firmware to be executed beyond simple concrete inputs. Another component of example embodiments, involves static analysis on assembly and IR instructions. The glue that binds these components is domain knowledge. Through informing example embodiments of the present disclosure about specific protocols such as USB, the present embodiments relate and guide the execution of the firmware binary to what is publicly known about the protocol. This allows analysis to begin from commonly available generic data—in exemplary cases herein, USB descriptors. From there more can be unraveled about the firmware's specifics, such as whether this data is actually referenced during operation.

FIG. 3 illustrates an exemplary flowchart illustrating a set of operations that may be performed in an example embodiment for training a USB vetting framework for USB device firmware verification.

Typically when a USB device is plugged in, the operating system will enumerate the device and, based on the class, interface it with the appropriate subsystems. Instead of sandboxing or requesting user input in order to determine how to classify a device, the present USB vetting framework directly examines the device firmware in order to query this information directly.

In embodiments, the present USB vetting framework begins its analysis by performing (operation 301) an initial pass for signatures relating to USB operation, such as interfaces. The type of interfaces that are expected to be supported by devices of the claimed identity are passed to the static analysis stage, which identifies memory addresses and instructions that would be relevant to an attack scenario. The static analysis component supports a variety of domain specific queries that can be used for (1) determining whether a device is malicious and (2) providing semantic slicing of the firmware for facilitating more accurate analysis such as symbolic execution. Memory references to these descriptors are discovered and any valid code location that is found is marked as a "target" for the symbolic execution stage (operation 302).

Upon finding these descriptors, the reported product, vendor IDs, configuration, and interface information are parsed based on US-BDB, a database of operational information that is extracted from the Linux kernel. Such parsing allows device firmware to be correlated (operation 303) against expected USB behavior.

The next stage is symbolic execution (operation 302), which can provide a more precise answer on reachability of instructions of interest or the target instructions that have been computed by the static analysis stage based on the specific semantic query.

The present USB vetting framework is able to search for any instance of USB misbehavior or non-adherence to the protocol, given the appropriate queries. Example embodiments support two types of queries focusing on the BadUSB attack. The first type of query is about potential interfaces the device may use during its operation, e.g., "Will the device ever claim to be an HID device?" The second type of query relates to consistency of device behavior based on the interface it claims to have, e.g., "Will the device send data entered by the user or will it use crafted data?"

The first query consists of a target reachability pass that attempts to reach the code referencing USB descriptors. When these locations are reached, the found path conditions will demonstrate the key memory addresses and values required to reach these locations, implying the ability to reach this code location during runtime on a real device. The path conditions required to reach this location in the code further inform the present USB vetting framework about the addresses being used for USB specific comparisons. For example, if an HID descriptor is reached, then one should expect to see a memory constraint of MEM[X]=33. Additionally, if an expected mass storage device firmware reaches an HID descriptor, this could be an indicator of malice or other anomalous behavior.

The second query is a check for consistency regarding USB endpoints. For example, if an endpoint for keyboard data flow is observed to reference a concrete value, this could indicate static keystroke injection. These gathered facts about the binary are used to construct a model of operation (operation 304) that is compared against an expected model of behavior (operation 305). This model is built from the known device VID, PID, and interface descriptors that are extracted from the binary and searched in the USBDB. Finally the results are reported for further review (operation 306).

Core Components. Example embodiments of the present disclosure used engines developed by the FIE and ANGR projects. In order to target these engines towards USB firmware, the underlying architecture support was first developed for each engine. This consists of machine definitions (registers, memory regions, I/O, etc.) and an 8051 machine code to IR translator known as a lifter. Using two different back-ends enables a better understanding of the strengths of each approach.

ANGR utilizes VEX IR, which was originally created for Valgrind—a dynamic program instrumentation tool. FIE embeds the KLEE symbolic execution engine, which uses LLVM IR, originally developed by the LLVM project as a compilation target. The IR syntax of VEX and LLVM differ greatly, but the underlying semantics of both 8051 lifters are virtually equivalent, with some exceptions. Each IR has different operations available to it. VEX IR has many specific operations relating to vector instructions and saturating arithmetic, while LLVM has no saturating IR operations to speak of. The specificity of the underlying IR can affect analysis tool understanding of program itself.

The complexity of these binary lifters is extremely high as they must map each and every subtle architectural detail from a reference manual written informally to the target IR and architecture specification. Beyond the likelihood of omitting a critical detail, some instructions may not easily map to a target IR, causing many IR instructions to be emitted. This is a major factor in the speed of the underlying execution engine and having an optimized and well-mapped IR can improve performance.

Threat Model. In designing a firmware analysis tool, assumptions must be made about the firmware images being analyzed. Example embodiments of the present disclosure involve an assumption that images being analyzed are genuine, meaning that they have not been specifically tampered with in order to interfere with analysis during firmware extraction or the build step.

It is otherwise assumed that the adversary has the ability to arbitrarily tamper with the firmware prior to its placement on the device or at any time prior to running the exemplary USB vetting framework presented herein. During analysis, the present USB vetting framework does not consider attacks on the USB protocol, vulnerabilities in the host drivers, or the physical layer (e.g. USB-C combined with Thunderbolt to perform DMA attacks) as protocol analysis and driver protection are handled by other solutions. In embodiments, the present USB vetting framework may consider attacks on the USB protocol, vulnerabilities in the host drivers, or the physical layer (e.g. USB-C combined with Thunderbolt to perform DMA attacks).

In example embodiments of the present disclosure, it is assumed that the adversarial device can operate within the USB specification, but can potentially masquerading as one or more devices. In summary, example embodiments of the present USB vetting framework assume firmware is genuine, unobfuscated, and non-adversarial to the analysis engine.

Example embodiments of the present disclosure leverage existing symbolic execution frameworks, which allows the present USB vetting framework to focus on identifying malicious USB firmware. The components developed support this analysis consist of two 8051 lifters to IR, modifications to ANGR to support interrupt scheduling, and the development of semantic firmware queries with a basis in the USB protocol.

FIG. 4 illustrates an exemplary flowchart illustrating a set of operations that may be performed in an example embodiment for converting binary firmware to a corresponding IR. Lifting to IR In order to reason about firmware, it is necessary to represent the firmware in a format that is amenable to symbolic analysis. An exemplary process of converting binary firmware into a corresponding IR is shown in FIG. 4. In example embodiments, two lifters were built for 8051 binaries: a lifter to VEX IR for use with ANGR and a lifter to LLVM IR for use with FIE. Both lifters were written to lift 8051 machine code to the equivalent or nearest representation in their respective IRs. Writing lifters is non-trivial because of the substantial number of instructions involved and the precision required. Every instruction and sub-opcode needs to be accurately mapped to the target IR.

The 8051 has 44 different mnemonics (e.g. ADD, INC, MOV, LJMP) across 256 different opcodes (e.g. INC A versus INC R0), each of which may define a one-byte, two-byte or three-byte instruction. For each opcode, the decoding pattern with operand types were manually encoded into a 256 entry table. Some example operand types included the accumulator (A), an 8 or 16-bit immediate, an address, or a general purpose register. Even with an architecture significantly less instruction-rich than Intel's current x86 and x86_64 architectures, this lifting process took months.

Any inaccuracy in lifting, no matter how subtle, may cause code paths to be ignored or incorrect values to be calculated during symbolic execution. Processor documentation is written to be read by humans, not machines, meaning that it is easy to miss technicalities while transcribing the instructions. For example, while lifting a specific 8051 MOV instruction, it was observed that unlike all other 8051 instructions, which followed the form of [op, dst, src], it is the only instruction to have the form of [op, src, dst] in the binary instruction stream. This detail was missed on the first lifting pass and caused subtle incorrect execution, leading to time-consuming debugging. Ideally, processor documentation would also be accompanied by an instruction specification. Such a formal definition of instructions, which would include their encoding and functionality, could possibly lead to an automatic lifter generator to be created.

There are very few disassemblers available for the 8051 architecture. Example embodiments of the present disclosure used D52 and mcs51-disasm disassemblers, in addition to a new, table-based 8051 disassembler built into the present VEX lifter and exposed to ANGR via a Python wrapper developed herein and referred to as py8051. To support the symbolic execution engines, the disassembled instructions are mapped to their corresponding IR. This mapping allows the engine to emulate hardware while revealing it in detail to the analysis engine. At this stage, additional information regarding the instruction set architecture and memory layout of the device is added. On 8051, a distinction between memory regions is required as there are numerous types of memory accesses, including memory-mapped registers, external RAM, and code bytes.

FIE Backend. To facilitate memory analysis, a translator was built that remaps 8051 machine code to LLVM IR for further use within FIE. The translator has two main components—Dictionary and Memory Layout. The dictionary maps 8051 instructions into their corresponding LLVM IR sequence, e.g., for an add instruction, the IR mapping is to LOAD the operands, ADD the loaded values, and STORE to the destination operand location. Memory Layout contains addresses of registers and special memory locations. This memory layout is loaded by FIE in order to correctly handle symbolic memory and normal memory operations. FIE also requires interrupt subroutines to be specified. This requires an extra step to specify function boundaries by matching them against the compiled and assembled file.

FIE was built as a source level analysis tool, operating on LLVM bytecode as generated by the Clang compiler. As a result, it was not designed to load raw binaries. Instructions that refer to code bytes in binary firmware may not be used properly without a direct reference to raw code bytes. These bytes are referred to for accessing constant data (e.g. USB descriptors and jump tables). Since FIE does not load code bytes, it does not support these instructions. To address this issue, example embodiments presented herein comprise modified FIE to load binary firmware to handle access to code regions. This allows for proper symbolic execution of the destination of the jumps, therefore increasing code coverage.

Example embodiments of the 8051 to LLVM IR lifter consisted of 1,967 lines of Java with 803 of 8051-to-IR specification mappings. Example changes to FIE consisted of 4,716 lines of C++.

ANGR Backend. The ANGR binary analysis platform is meant to be used in projects as a Python library. It supports many binary formats (e.g. ELF, PE, MachO, raw binary) and many processor architectures (e.g. ARM, AArch64, x86, x86_64, PPC) out-of-the-box. Despite this, during initial development of example embodiments of the present disclosure, no processor architecture with a word size less than 32-bits was supported. This has recently changed with the addition of AVR support. Going forward with the present USB vetting framework, ANGR is used as a library with as little modifications made to the core architecture independent code as possible. This allows for rebasing modifications specific to the present USB vetting framework when a new version of ANGR is released.

The ANGR project is made up of three major subprojects—a binary file loader CLE Loads Everything (CLE), a symbolic execution engine SimuVEX, (the present embodiments employed a version of ANGR (07bb8cbe) that is before SimuVEX and the core were merged) and an architecture definition repository, arch-info. ANGR composes these and many other code bases and provides Projects, Paths, PathGroups, and many more abstractions to aid in analyzing binaries. In order for ANGR to support the 8051 architecture, the aforementioned VEX IR lifter was developed, as well as a firmware loader in CLE, architecture definition file in archinfo, disassembler wrapper (py8051), and IR-specific CCalls in SimuVEX for load and store addresses. CCalls are an IR expression that acts as a callback into a function. It is primarily used by VEX to assist in supported complicated IR blocks, and is utilized in exemplary embodiments to resolve 8051 memory addresses to regions.

Example embodiments of the present disclosure comprise an architecture loader consisting of a mapping between the 8051 VEX guest state structure, which contains the 8051 CPU registers, to human-readable register names. The firmware loader that was added was responsible for mapping in the binary's code section and automatically discovering ISRs for later scheduling. In order to have parity with FIE, an ExecutionTechnique was written for ANGR to support the dynamic scheduling of interrupts. The 8051 architecture uses an interrupt vector table in which the first bytes of a firmware image are trampolines to an Interrupt Service Routine (ISR) or a reti, which means no ISR. Knowledge of the 8051 interrupt semantics were used to limit when they and which ones were run. To improve the execution time of firmware binaries, code coverage is an introduced metric in order to give the engine feedback on path performance. Additionally, a randomized cooldown was created for ISR scheduling order to facilitate binaries that have expensive ISRs. One more heuristic that was incorporated was the ability to detect looping paths with a fixed threshold. This functionality was already built into ANGR, but the present embodiments utilize it to continually prune paths not making any progress.

VID/PID Based Inference

To figure out what a firmware image would look like to the operating system when flashed on to a device, how the operating system recognizes a USB device and loads the corresponding driver is simulated. Ideally, one would expect to find all the necessary information about the device using its Vendor ID (VID) and Product ID (PID). Unfortunately, this only works for a small portion of USB devices, an exception being USB class devices. These devices usually follow a specific USB class specification, e.g., USB Mass Storage. The benefit of having USB class devices is that the OS can provide a general purpose driver to serve devices from different vendors—as long as they follow the USB class specification. In this case, the bDeviceClass solely determines the functionality of the device. Another exception comes from USB composite devices. These devices expose multiple interfaces and functionalities to the operating system. For instance, a USB headset may control an HID interface and three audio interfaces. This is good example of where a simple VID/PID pair is just not enough to find two different drivers at the same time.

To solve these issues, all the USB device matching information is extracted from the Linux 4.9 kernel, and is saved as a "USBDB." The present embodiments comprise a full implementation of how the Linux kernel uses the USB device descriptor, configuration descriptors, and interface descriptors to match a device driver. Besides simple VID/PID matching, there are another nine matching rules to find the corresponding drivers. With the help of USBDB, the behavior or functionality of the device firmware is precisely anticipated, without having it interact with the actual OS.

FIG. 5 provides a flowchart illustrating a set of operations that may be performed in an example embodiment for training a USB vetting framework for USB device firmware verification.

As shown in block 502 the diagnostic computing entity 10 includes means, such as communications interface 120, memories 110 or 115, or the like, for receiving a firmware image extracted from a USB device 20. In this regard, the diagnostic computing entity 10 may itself extract the firmware image from the USB device 20, such as when the diagnostic computing entity 10 is connected to the USB device 20 via a USB port. However, in other embodiments, the firmware image may be extracted by another device that is connected to the USB device 20 (e.g., information/data computing entity 30) and may thereafter be transmitted to diagnostics computing entity 10 for analysis. In yet another embodiment, the firmware image from the USB device 20 may be retrieved from one of the memories (110 or 115) of the diagnostic computing entity 10 (i.e., where it had been stored sometime in the past for later analysis), so retrieval of the firmware image comprises a transfer of the firmware image from one of the memories.

As shown in block 504, the diagnostic computing entity 10 includes means, such as processing element 105 or the like, for identifying signatures from the firmware image relating to USB operation. Examples of and various operations associated with this signature identification process is described in further detail with respect to FIGS. 7A-7E, FIGS. 8A-8E, FIGS. 9A-9D, FIGS. 10A-10F, and FIGS. 11A-11C. In embodiments, bock 504 is associated with Algorithm 2 (as discussed below) being invoked by Algorithm 1 (as discussed below).

As shown in block 506 the diagnostic computing entity 10 includes means, such as processing element 105 or the like, for building an expected model of operation of the USB device 20 using the identified signatures and a database of operational information regarding USB devices. The expected model of operation may be built from vendor identifiers, product identifiers, and interface descriptors that are extracted from the firmware image of the USB device 20 in consultation with the database of operational information regarding USB devices. In embodiments, the database features can be generated by collecting device and driver details from operating system kernels.

As shown in block 508, the diagnostic computing entity 10 includes means, such as processing element 105 or the like, for generating a recovered model of operation of the USB device 20 based on the firmware image and the identified signatures. This operation is described in below in connection with FIG. 6.

As shown in block 510, the diagnostic computing entity 10 includes means, such as processing element 105 or the like, for comparing the recovered model of operation with the expected model of operation to identify unexpected or unknown behaviors. Additional details regarding to the comparison to the expected functionality are provided below.

Finally, as shown in optional block 512, the diagnostic computing entity 10 may include means, such as communications interface 120, memories 110 or 115, or the like, for generating (and outputting or transmitting) a report comprising identified unexpected or unknown behaviors identified in operation 308.

FIG. 6 provides another flowchart illustrating a set of operations that may be performed by the diagnostic computing entity 10 in another example embodiment to generate the recovered model of operation of the USB device 20.

As shown in block 602, the diagnostic computing entity 10 includes means, such as processing element 105 or the like, for generating an intermediate representation corresponding to the firmware image of the USB device 20. In some embodiments, machine code comprising the firmware image may be translated or "lifted" into one or more architecture-independent representations, as described in further detail with respect to FIG. 4 above.

As shown in block 604, the diagnostic computing entity 10 includes means, such as processing element 105 or the like, for performing static analysis of the identified signatures to identify a set of target instructions relevant to an attack scenario. Examples of and various operations associated with this target instruction identification process is described in further detail with respect to FIGS. 7A-7E, FIGS. 8A-8E, FIGS. 9A-9D, FIGS. 10A-10F, and FIGS. 11A-11C. In embodiments, Algorithm 4 (as discussed below) is associated with blocks 604 and 606.

As shown in block 606, the diagnostic computing entity 10 includes means, such as processing element 105 or the like, for performing symbolic execution using the intermediate representation to identify reachability of each target instruction in the set of target instructions. Examples of performing symbolic execution are explained more fully with respect to FIGS. 11A-11C.

Finally, as shown in block 608, the diagnostic computing entity 10 includes means, such as processing element 105 or the like, for constructing the recovered model of operation of the USB device 20 based on the static analysis of the identified signatures and the symbolic execution.

Semantic Analysis

Example embodiments of the present disclosure comprise developed algorithms that employ a combination of static analysis and symbolic execution to compute and check reachability of candidate target instructions for the semantic queries. Static analysis algorithms presented in this section refer to elements from the LLVM IR. While the descriptions herein discuss LLVM IR, they are equally adaptable to the VEX IR.

Query Type 1 ("The Claimed Identity")

A USB device communicates with the host by responding to requests from it. Among those requests, GetDescriptor requests have a special role as the response from the device is when the device tells the operating system about itself. Depending on the type of the descriptor, the device would respond with specific information such as general device characteristics and configurations. For HID devices, for example, additionally a report descriptor would be requested so that the host knows how to interpret data from the HID device. What is common among these information exchanges is that the device communicates with the host through its endpoint 0 (EP0), which corresponds to one of the ports of the device. So it is reasonable to assume that the firmware would be copying the device descriptor, the configuration descriptor, and functionality specific information, such as the HID report descriptor, to the same buffer.

FIGS. 7A-7E illustrate a set of operations that may be performed in an example embodiment for identifying candidate instructions that copy functionality/protocol specific information to an endpoint 0 (EP0) buffer. The set of operations depicted in FIGS. 7A-7E may be referred to herein as "Algorithm 1."

The set of operations depicted in FIGS. 7A-7E identify candidate instructions that may be copying functionality specific information, e.g., a HID report descriptor, by leveraging the aforementioned fact regarding the firmware copying various information to the EP0 buffer.

As shown in block 702 (and through FIGS. 7A-7E), the diagnostic computing entity 10 includes means, such as processing element 105 or the like, for identifying constant parts in all relevant descriptor types (e.g., the device descriptor, the configuration descriptor, and functionality specific information).

As shown in block 704 (and through FIGS. 7A-7E), the diagnostic computing entity 10 includes means, such as processing element 105 or the like, for scanning the data segment of the binary for potential memory locations that may hold these descriptors (lines 2-15 of FIG. 7A).

As shown in block 706 (and through FIGS. 7A-7E), the diagnostic computing entity 10 includes means, such as processing element 105 or the like, for using store instructions that copy from candidate configuration descriptors or candidate device descriptors to compute the set of potential memory locations that correspond to EP0 buffer (lines 17-25 of FIG. 7A).

As shown in block 708 (and through FIGS. 7A-7E), the diagnostic computing entity 10 includes means, such as processing element 105 or the like, for identifying instructions that copy data from candidate HID report descriptor buffers to the candidate EP0 buffers as the target instructions (lines 26-32 of FIG. 7A) and are returned as output along with the candidate EP0 addresses.

FIGS. 8A-8E illustrate a set of operations for tracking data flow among memory locations, in accordance with example embodiments described herein. The set of operations depicted in FIGS. 8A-8E may be referred to herein as "Algorithm 2."

The set of operations depicted in FIGS. 8A-8E (i.e., Algorithm 2) track data flow among memory locations by keeping track of the address values stored in or indirectly accessed via memory mapped registers.

As shown in block 802 (and through FIGS. 8A-8E), the diagnostic computing entity 10 includes means, such as processing element 105 or the like, for associating a tuple with the source and destination of instructions, when applicable, and stores in a map M (line 4 of FIG. 8A). The first component of the tuple represents a potential address value and the second component represents a tracked address value, which represents the memory location from which the data originates. At the initialization stage, every instructions' source and destination are mapped to $(\bot,\bot)$ pairs (line 4 of FIG. 8A).

As shown in block 804 (and through FIGS. 8A-8E), the diagnostic computing entity 10 includes means, such as processing element 105 or the like, for locating store instructions that copy constant values to memory mapped registers and stores in a work list (lines 5-11 of FIG. 8A).

As shown in block 806 (and through FIGS. 8A-8E), the diagnostic computing entity 10 includes means, such as processing element 105 or the like, for processing all of the items in the work list one at a time until the work list becomes empty. For each instruction, it finds uses of the destination value of instruction i and propagates the tuple M(i.dst) based on the type of the dependent instruction.

Case 1) getelementptr instruction (lines 27-29 of FIG. 8A): Since this instruction is used to compute a pointer using an index value, the first component of the tuple M(i.dst) becomes a tracked address and, hence, copied to the second component in the generated tuple. The first component of the generated tuple is a $\bot$ as the USB vetting framework does not try to keep track of values stored in locations other than the memory mapped registers.

Case 2) Other instructions (lines 19-26 of FIG. 8A): The tuple is copied as is because of the fact that the instructions store, zext, and load preserve the value as well as the tracked address. For store instructions, the use dependence may be due to the source or the destination and therefore, the appropriate item is updated whereas for all other instruction types only the tuples are propagated the destination. A dependent instruction ui is added to the work list as long as it is not a store instruction with a destination that is not a memory mapped register. It is important to note that this is not a fix-point computation algorithm as an instruction is visited at most twice (lines 15-18 of FIG. 8A) and, hence, it is an under-approximate points-to analysis.

TABLE 1

Value and Tracked Address Propagation Using Algorithm 2 for a Sample 8051 Code Block

| Instruction | Source | Destination |
| --- | --- | --- |
| L1: mov dptr, #X276c | NA | (X276c, $\bot$) |
| L2: mov a, @dptr | ($\bot$, X276c) | ($\bot$, X276c) |
| L3: mov r4, a | ($\bot$, X276c) | ($\bot$, X276c) |
| L4: mov dptr, #Xf1dc | NA | (Xf1dc, $\bot$) |
| L5: movx @dptr, a | ($\bot$, X276c) | ($\bot$, Xf1dc) |

To demonstrate the value propagation, consider the sample 8051 code block (avoiding the rather lengthy translation to LLVM IR) given in Table 1. Data is moved from address X276c to address Xf1dc at line L5. In instruction movx @dptr,a, the source is a register, a. The present USB vetting framework is interested in neither a's address nor its value. However, what the present USB vetting framework is interested in is the address that it received its value from. Similarly, the present USB vetting framework is interested in the address that dptr is pointing to. The indirect addressing happens at L2 and at L5, which cause the values, X276c and Xf1dc, to become tracked addresses, respectively. In the context of Algorithm 1 (e.g., FIGS. 7A-7E), L2 may represent reading from a configuration descriptor as in line 19 or a device descriptor as in line 22 (referring to FIG. 7A). If so, if the tracked destination address in line L5 is a constant then it is added to the set of candidate endpoint 0 addresses as in line 20 or line 23 of FIG. 7A.

Query Type 2 ("Consistent Behavior?")

A USB device that claims to have certain functionality is one thing, but whether it actually carries out that function is another. Therefore, it is important to check firmware for behavior that is consistent with the claimed functionality. As an example, a USB device that is claiming to have HID functionality and sending keys that are not actually pressed and then loaded in from a I/O port is not behaving consistently. To detect such inconsistent behavior, what would be consistent must be defined first. Obviously, this requires considering specific functionality as, for example, what is consistent for HID may not be consistent with a Mass Storage device.

In examples targeting BadUSB attacks, the focus is on defining and checking for consistent behavior of HID devices. An HID device is expected to send to the host whatever it receives from the user. If, as in the case of BadUSB, it is injecting keys that have not been pressed then it could mean it is either sending data that it reads from a buffer stored in memory or sending some constant values. How can the present USB vetting framework differentiate between such crafted buffers and those that may hold user-provided data? The key here is the interrupt mechanism. When a user presses a key, an interrupt is generated and the firmware handles the interrupt to store the specific key(s) pressed. Memory locations that are read inside the interrupts are the source of data provided by the external environment. By marking these addresses as symbolic, those addresses that are filled by the environment (as opposed to appearing statically in the binary image) are distinguished from those that are not.

Finding Symbolic Locations.

FIGS. 9A-9D illustrate a set of operations for finding memory locations that should be represented symbolically, in accordance with example embodiments described herein. The set of operations depicted in FIGS. 9A-9D may be referred to herein as "Algorithm 3."

The set of operations of FIGS. 9A-9D (i.e., Algorithm 3) identify memory locations that need to be represented symbolically. Since such locations are processed in interrupt functions, the algorithm symbolically executes the firmware for a single interrupt function at a time.

As shown in block 902 (and through FIGS. 9A-9D), the diagnostic computing entity 10 includes means, such as processing element 105 or the like, for, as paths and the corresponding execution states get generated, storing locations written inside the interrupt function on the current path in a map, WSet, by a listener, recordStores (e.g., lines 11-15 of FIG. 9A), that is registered with the symbolic execution engine.

As shown in block 904 (and through FIGS. 9A-9D), the diagnostic computing entity 10 includes means, such as processing element 105 or the like, for detecting, using another listener, checkLoads (e.g., lines 5-10 of FIG. 9A), load instructions reading from memory locations that have not been written in the same interrupt function and on the current path.

As shown in block 906 (and through FIGS. 9A-9D), the diagnostic computing entity 10 includes means, such as processing element 105 or the like, for, adding the source location of such a load instruction to the set of symbolic values and symbolic execution is restarted with the updated set of symbolic values. For each interrupt function, this process is repeated for a given number of iterations, τ.

When Endpoints Can Be Predicted.

Another issue is identifying the endpoint address that will be used for sending HID data. The endpoint number that will be used for the specific functionality is extracted by scanning the interface descriptors that come after the configuration descriptor. To acquire the endpoint address, the endpoint buffer candidates computed by Algorithm 1 can be used as each endpoint is normally allocated by having a constant amount of offset from the consecutive endpoints. This constant offset is the packet size, which can be 8, 16, 32, or 64 bytes depending on the speed of the device.

FIGS. 10A-10F illustrate a set of operations for detecting concrete data flows to endpoint buffers, in accordance with example embodiments described herein. The set of operations depicted in FIGS. 10A-10F may be referred to herein as "Algorithm 4." Algorithm 4 shows how candidate endpoint buffer addresses can be used to detect concrete value flows into a potential endpoint buffer.

As shown in block 1002 (and through FIGS. 10A-10f), the diagnostic computing entity 10 includes means, such as processing element 105 or the like, for computing candidate endpoint buffers based on a given number of maximum endpoints to be considered and the constant offsets (lines 7-12 of FIG. 10A).

As shown in block 1004 (and through FIGS. 10A-10F), the diagnostic computing entity 10 includes means, such as processing element 105 or the like, for identifying the store instructions that may be storing to an endpoint buffer (lines 13-19 of FIG. 10A).

As shown in block 1006 (and through FIGS. 10A-10F), the diagnostic computing entity 10 includes means, such as processing element 105 or the like, for identifying add and subtract instructions that may be manipulating counters. If such an instruction does not have a getElementPtr reference, then it probably is not used as an index into an array. If such an instruction's destination address can be resolved, the respective memory location is identified as a potential counter (lines 20-27 of FIG. 10A). Such counters are often used to delay the attack and becomes a bottleneck similar to the loops for symbolic execution engines.

As shown in block 1008 (and through FIGS. 10A-10F), the diagnostic computing entity 10 includes means, such as processing element 105 or the like, for marking all counter locations as symbolic in addition to the other variables symbolic addressed that have been passed as an input the algorithm (line 28 of FIG. 10A).

As shown in block 1010 (and through FIGS. 10A-10F), the diagnostic computing entity 10 includes means, such as processing element 105 or the like, for detecting and storing suspicious instructions. By registering a listener, checkConcAccesses (lines 2-6 of FIG. 10A), for the symbolic execution engine, suspicious instructions that may be reading a constant value into an endpoint buffer are detected and stored in FlaggedAccesses.

When Endpoints Cannot Be Predicted.

FIGS. 11A-11C illustrate a set of operations for detecting inconsistent data flows, in accordance with example embodiments described herein. The set of operations depicted in FIGS. 11A-11C may be referred to herein as "Algorithm 5."

There may be cases when endpoints are setup via the hardware logic and are not easily guessed, i.e., the constant offset hypothesis fails. In such cases malicious behavior can still be detected by checking for inconsistent data flow as shown by Algorithm 5. Algorithm 5 assumes that the device sometimes acts non-maliciously (i.e., the data sent to the host is read from a symbolic location), and sometimes acts maliciously (i.e., the data sent to the host is read from a concrete location).

As shown in block 1102 (and through FIGS. 11A-11C), the diagnostic computing entity 10 includes means, such as processing element 105 or the like, for performing a pass of the symbolic execution algorithm with two listeners (line 18 of FIG. 11A).

As shown in block 1104 (and through FIGS. 11A-11C), the diagnostic computing entity 10 includes means, such as processing element 105 or the like, for, using an exemplary Listener recordAccesses, recording whether a store into a memory location gets its data from a symbolic or a concrete source along with the block identifier as the context information (lines 6-13 of FIG. 11A).

As shown in block 1106 (and through FIGS. 11A-11C), the diagnostic computing entity 10 includes means, such as processing element 105 or the like, for, upon termination of the symbolic execution algorithm, identifying (using an exemplary listener checkConcAccesses) memory locations that are known to receive symbolic values in some contexts and concrete values in others (lines 14-17).

As shown in block 1108 (and through FIGS. 11A-11C), the diagnostic computing entity 10 includes means, such as processing element 105 or the like, for storing instructions that write to such memory locations using concrete sources are stored in FlaggedAccesses and returning them.

VI. EVALUATION AND EXPERIMENTAL RESULTS

The present USB vetting framework has been evaluated based upon two malicious firmware images and across separate backend engines built on ANGR and FIE. One firmware binary that analyzed is reverse engineered C code from a Phison 2251-03 USB controller (Phison) and the other (EzHID) implements a keyboard for the Cypress EZ-USB. A key difference between the images is that the Phison firmware is meant to act as a mass storage device, but contains hidden code to act as a Human Interface Device (HID), whereas EzHID acts as a normal keyboard, but injects malicious keystrokes at run time. The evaluation goals are to determine what USB configurations a firmware will act as during run time in order to compare against an expected device model and to search for inconsistent behavior of its claimed identity.

All evaluation was performed on a SuperMicro server with 128 GiB of RAM and dual Intel® Xeon® CPU E5-2630 v4 2.20 GHz CPUs for a total of 20 cores. The ANGR Engine used Python 2.7.10 running on PyPy 5.3.1 while the FIE Engine used a modified version of KLEE[16] on LLVM-2.9. In practice, due to implementations of the backends themselves, the present USB vetting framework was only able to utilize a single core (Python 2.7 and KLEE are single threaded). Except for making the EzHID firmware malicious, the firmware images were not modified to aid the present USB vetting framework during analysis.

The evaluation begins with an explanation of the firmware benchmarks used, followed by the output of the symbolic location finder from Algorithm 3, then on towards the domain informed algorithms, and finally Query 1 and Query 2 on both firmwares.

Benchmarks

The first firmware used for analysis is the Phison Firmware. It was reverse engineered in to C code by and then modified to perform a BadUSB attack. The firmware initially enumerates itself as a Mass Storage device and later may re-enumerate as an Human Interface Device. After a predefined threshold count, it starts sending input data from a hardcoded script. Since the device is now operating as a keyboard, the sent data is accepted as valid keystrokes. The Phison firmware runs on top of an 8051 core, which influenced the choice to select Intel's 8051 architecture as the initial target to analyze.

The second USB firmware case study was based on the EzHID Sun Keyboard firmware. In normal usage this firmware was meant to work with an EZ-USB chip for bridging the legacy Sun keyboard to a modern USB bus. From the stock firmware, the image was modified with a malicious keystroke injector, similar to that of the Phison firmware. After a set delay, the firmware will begin to inject a series of static scan codes on to the active USB bus. This interrupts the normal flow of keystrokes from the Sun keyboard until the injection has completed. EzHID's firmware was chosen as it was readily available online and also compatible with the 8051 architecture (with 8052 SFR and RAM extensions).

Symbolic Values

As explained above, Algorithm 3 finds the memory locations that need to be symbolic in order to analyze the firmware. Example embodiments of the present USB vetting framework utilize two symbolic execution engines both of which require specified symbolic memory regions. Large portions of both benchmarks are only conditionally accessible. Without the correct regions being symbolic the code cannot be properly covered and the analysis becomes incomplete. When no memory region is set symbolic the coverage achieved for Phison is 17.20% and for EzHID it is 22.49%. In this case interrupts are still fired but due to unmet conditions, not much of the code is executed until the code finally ends up executing an infinite loop. Since the target instructions are also guarded by conditions, the symbolic execution never reaches them. As a result, the malicious property of the firmware cannot be determined without more symbolic memory. To improve this, Algorithm 3 may be used to set memory regions as symbolic, causing the framework to reach the targets.

TABLE 2

Time for Each USB Vetting Framework backend to reach USB-related Target Instructions (Query 1) for Two Firmwares

| Firmware Name (Controller) | Symbolic | Domain Spec. | Time to Target (seconds) | | | | Coverage at Target (%) | | | |
|---|---|---|---|---|---|---|---|---|---|---|
| | | | ANGR Engine | | FIE Engine | | ANGR Engine | | FIE Engine | |
| | | | Config | HID | Config | HID | Config | HID | Config | HID |
| Phison (Phison 2251-03) | Full | No | — | — | 384.40 | 43.49 | — | — | 59.60 | 46.47 |
| | Partial | No | 68.91 | 68.72 | 58.54 | 21.64 | 49.53 | 48.58 | 48.61 | 41.91 |
| | Full | Yes | — | — | 55.77 | 7.91 | — | — | 44.66 | 38.87 |
| | Partial | Yes | 70.28 | 70.09 | 7.68 | 5.64 | 49.53 | 48.58 | 38.88 | 36.26 |
| EzHID (Cypress EZ-USB) | Full | No | 10.76 | 24.04 | — | — | 25.92 | 36.47 | — | — |
| | Partial | No | 9.65 | 22.07 | 63.52 | 67.04 | 25.92 | 36.47 | 42.06 | 43.08 |
| | Full | Yes | 5.33 | 11.88 | — | — | 11.24 | 14.45 | — | — |
| | Partial | Yes | 5.18 | 11.13 | 9.45 | 9.87 | 11.24 | 14.45 | 37.95 | 38.71 |

An interesting aspect here is the contrast between the two benchmarks. Phison uses direct addressing for most of the memory reads and the conditional variables on the target path. On the other hand, EzHID uses indirect reads from memory for conditional variables in the path to target. By recording loads and stores for each path the destination of indirect memory accesses could be recorded. Example embodiments resulted in a finding that only 26 bytes for Phison and 18 bytes for EzHID should be set symbolic. It took one iteration for each byte of the symbolic set to get all the symbolic memory locations needed to reach Query 1 target. The minimum and maximum time taken by one iteration is respectively 3.39 and 8.42 seconds. Setting memory partially symbolic based on algorithms disclosed herein increased efficiency greatly. It allowed fewer paths to be created compared to setting the full memory region symbolic. From Table 2 it can be seen that a maximum of 2× speed up has been achieved in reaching targets. The algorithm helped in reducing the number of paths to execute when compared to a fully symbolic memory execution. From the tests a 72.84% reduction has been observed in number of paths created to reach targets for Phison. A certain amount of instructions must be covered to reach the target, that is why instruction coverage does not reduce as significantly as the number of paths. But this path reduction entails less branches being created which in turn increases speed.

Domain Informed Analysis

Target Finding

A preliminary step, before symbolically executing the firmware images, is to utilize knowledge of the USB constants and byte patterns to identify targets in the binary to execute towards. Using Algorithm 1, the binary image is scanned for static USB descriptors and search for all cross-references (XREFs) to these descriptors via load instructions. The F$_{IE}$ Engine utilizes signature scanning and a pass over the LLVM IR while ANGR Engine uses signature scanning and the built-in CFGFast Control Flow Graph recovery routine to automatically generate XREFs.

Using the target finding, USB configuration descriptors were identified with the pattern [09 02 ?? ?? ?? 01 00], device descriptors with [12 01 00 ?? 00], and HID keyboard reports starting with the bytes [05 01 09 06 A1]. The ?? in a pattern means that the byte at that position can take on any value. This makes the signatures more robust against changing descriptor lengths.

FIG. 12 provides an example of code resulting from analyses according to embodiments of the present disclosure. FIG. 12 illustrates an example extracted from the Phison firmware image showing the clear reference to the descriptor via a mov into DPTR (a 16-bit special pointer register) followed by a movc from the code section. F$_{IR}$-$_{M}$USB would then zero in on the 0xbf4 address as that is what is reading from the descriptor address.

The present disclosure relates to refining the dynamic analysis process through limiting the set of symbolic data and further constraining this limited set. Using Algorithm 3, a subset of symbolic variables is created to be instantiated during the dynamic analysis. Through limiting the amount of symbolic memory, the targets are reached significantly faster. Over-approximation of symbolic memory is guaranteed to reach all program paths at the expense of a potentially intractable amount of created states. Table 2 demonstrates the benefits of selectively deciding symbolic variables in terms of analysis speed while executing Query 1.

The analysis is further optimized by utilizing preconditioned execution or USB specific domain constraints to selected symbolic variables. By adding initial conditions before running a query, the query may complete faster. It is also possible to over-constrain execution causing the query to end early, run very slow, or never complete. In order to know which constraint to apply and where, facts are first gathered from found targets with constraints already applied. By modifying these constraints with respect to USB specific constants, it is possible to quickly reach USB-specific or prevent reaching of less important code paths.

Target Reachability (Query 1)

Using the present USB vetting firmware's knowledge of the USB protocol, interesting code offsets in the firmware binary are identified. These targets are searched for during a symbolic execution pass. If a target is found, the path information will be saved and the wall-clock time and current code coverage will be noted. Information collected includes the path history, which includes every basic block executed, all path constraints, and every branch condition. Targets are the primary basis for gathering additional information on firmware images. It links the previous static analysis pass to a satisfiable path. This enables more advanced analysis and inference of a firmware's intent.

Phison. The examination begins by looking for USB specific constants in Phison to reason about Query 1. What was found is shown in Table 3.

TABLE 3

The Found Patterns and XREF's from Phison

| Pattern Name | Pattern | Code Address | XREF(s) |
|---|---|---|---|
| DEVICE_DESC | [12 01 00 ?? 00] | 0x302b | 0xb89 |
| CONFIG_DESC | [09 02 ?? ?? ?? 01 00] | 0x303d | 0xbd5 |
| HID_REPORT | [05 01 09 06 A1] | 0x3084 | 0xbf1 |

Using static analysis on the generated IRs, instructions were found that use either one of the descriptors to load from. For each descriptor a set is kept that records the destination addresses where these descriptors get copied to. The intersection of these sets was used to find the possible set of EP0 address. In this case there was only one common element and the EP0 address was found to be 0xf1dc. Comparing with the source code informed that this was indeed the address of the FIFO in EP0. This enabled finding the instruction where the HID descriptor was being copied to EP0. The target could be reached in a short time using Algorithm 3 to set symbolic regions for the analysis engines. The times shown in Table 2 illustrate the effectiveness of the presently described algorithms in reaching Query 1 targets. When Algorithm 3 is not applied, the time to reach targets is highest. The combination of Algorithm 3 and domain specific constraining gives the best performance. When the size of symbolic memory region is reduced, the present embodiments automatically end up with fewer paths to go in. Since symbolic regions are determined in a sound way herein, the target is reached with a lower number of paths to test.

Also, domain specific constraining further improves the performance. The path was restricted based on two factors— USB speed change packets, which do not affect the query, and making sure to guide the execution to call the GET_DE-SCRIPTOR function as the successor when the deciding switch statement comes. This pruning is sound for reachability testing because domain specific knowledge is combined. Using these optimizations, example embodiments herein achieved maximum of 7.7× speed up compared to the fully symbolic version's unconstrained execution for HID target.

EzHID. Using the target finding, example embodiments located USB configuration descriptor, a device descriptor, and an HID report in EzHID.

TABLE 4

The Found Patterns and XREF's from EzHID

| Pattern Name | Pattern | Code Address | XREF(s) |
|---|---|---|---|
| DEVICE_DESC | [12 01 00 ?? 00] | 0xb8a | 0x18b |
| CONFIG_DESC | [09 02 ?? ?? ?? 01 00] | 0xb9c | 0x1a4 |
| HID_REPORT | [05 01 09 06 A1] | 0xbbe | 0x250 |

Then a static analysis was utilized to find code address XREFs for all targets as shown in Table 4. With the list of targets, an exemplary USB vetting framework as described herein was activated for both backends. The first pass identified the required path conditions for reached targets, which allowed optimization of additional runs by constraining SETUP data packet addresses that satisfy the following constraint XRAM[0x7fe9]==6 from FIG. 13 (FIG. 13 illustrates exemplary path constraints associated with analyses according to embodiments of the present disclosure). 0x7fe9 corresponds to the second byte of the USB setup data packet which is the field bRequest. By limiting this to 0x06, the execution is effectively constrained to paths that satisfy the GET_DESCRIPTOR call. For EzHID, this eliminates all other request types, which speeds up time-to-target and further analysis. Shown in Table 2, EzHID performs better when domain constraining is enabled, but with a partial symbolic set the time to target has little change. This is due to the shallow target, which does not have time to benefit from the partial set. FIE is unable to complete the Full version of EzHID due to a memory out of bounds error, which is a limitation of KLEE's symbolic memory model.

Consistent Behavior (Query 2)

A second important query to vetting USB device firmware is detecting inconsistent use of USB endpoints. In a typical mass storage device, one would expect SCSI commands to arrive, data to be read from flash memory, and then transferred out over an I/O port to the USB bus. While analyzing firmware, example embodiments herein treat memory reads from I/O regions (typically external RAM or XRAM) as symbolic. Therefore, a consistent firmware image for either mass storage or HID should read symbolic data, process it, and pass it along. An inconsistency would occur if a firmware writes symbolic and concrete data to an output port from different code blocks. Example embodiments herein perform dynamic XRAM write tracking as specified in Algorithm 4 and Algorithm 5.

Phison. Concrete data flow was checked in the firmware using Algorithm 4. Since all inputs were set to be symbolic there should only be symbolic data flowing to endpoints except EP0 for descriptors. The concrete data flow to endpoints in this case entails stored data being propagated to the host. As the Phison firmware should work as a mass storage device firmware this behavior is inconsistent. EP0 found for Query 1 is used to calculate other endpoint addresses using constant offset. A threshold count of 8192 was there in the firmware. Due to this count the concrete data flow was getting delayed and the symbolic execution engines did not execute the malicious code region. That is why Algorithm 4 was extended to incorporate these counters that compare with the threshold. The algorithm was used to find the counters that may guard this execution. 14 more bytes of memory were found and included to the already found symbolic memory regions. Once these additional memory regions were made symbolic the Query 2 target could be reached for Phison. Constant data was found being copied to EP3. With the new set of symbolic memory, it took 928.56 seconds to reach the target with 69.98% instruction coverage. There was one false positive due to a SCSI related constant being copied to EP1.

EzHID. After finding the USB specific targets, this firmware does not appear suspicious as it is supposed to be a keyboard firmware. In order to further vet this image, a consistency check was performed on the USB endpoint usage. This query consists of running the firmware image for an extended period in order to capture as many XRAM writes as possible. If an inconsistency is detected, the results and offending instructions (and data) are printed for further investigation. Using Algorithm 5 to detect when an inconsistency has occurred, the ANGR Engine then prints out the offending memory writes, their write addresses, and the section of code that did the writing. There are some false positives, but the most consistent violations (more than one violation indicating many writes) will be ranked higher. Query 2 was run for 30 minutes to gather the results which are displayed in Table 5.

The first row of Table 5 shows the discovered inconsistent writers, where one writes symbolic scancodes and another only concrete data from the firmware images. The next two rows are false positives, which also have many different write sites, but the difference is that each write address only writes a single concrete value. The same writer does not have multiple violations (such as writing many different keystrokes).

TABLE 5

Results from Running Query 2 on EzHID for 30 Minutes

| Write Address | Writers | Symbolic Value | Concrete |
|---|---|---|---|
| 0x7e80-0x7e78 | 0x991, 0xa7e | Scancode[0-7] | 0x0, 0xe2, 0x3b, 0x1b, 0x17, 0x08, 0x15, 0x10, 0x28 |
| 0x7fd4 | 0x199, 0x1b2, 0x22c, 0x1e9, 0x139, 0x25e, 0x6d7, 0x161 | SDAT2[7fea] | 0x0, 0xb, 0x7f |
| 0x7fd5 | 0x1a2, 0x1bb, 0x237, 0x201, 0x201, 0x267, 0x6d7, 0x161 | SDAT2[7fea] | 0x0, 0x8a, 0x9c, 0xae, 0xe8, 0xbe |

VII. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for analyzing firmware of a Universal Serial Bus (USB) device, the method comprising:
   receiving a firmware image extracted from the USB device;
   identifying signatures from the firmware image relating to USB operation;
   building an expected model of operation of the USB device using the identified signatures and a database of operational information regarding USB devices;

generating a recovered model of operation of the USB device based on the firmware image and the identified signatures, wherein generating the recovered model of operation of the USB device comprises:
  performing static analysis of the identified signatures to identify a set of target instructions relevant to an attack scenario; and
  performing symbolic execution using the intermediate representation to identify reachability of each target instruction in the set of target instructions;
identifying memory locations that need to be represented symbolically, wherein identifying the memory locations comprises:
  storing locations written inside an interrupt function on a current path in a map that is registered with a symbolic execution engine;
  detecting load instructions reading from memory locations that have not been written in a same interrupt function and on the current path;
  adding a source location of a detected load instruction to a set of symbolic values; and
  restarting symbolic execution using an updated set of symbolic values comprising the source location; and
comparing the recovered model of operation with the expected model of operation to identify unexpected or unknown behaviors.

2. The method of claim 1, wherein generating the recovered model of operation of the USB device further comprises:
  prior to performing static analysis, generating an intermediate representation corresponding to the firmware image; and
  subsequent performing symbolic execution, constructing the recovered model of operation of the USB device based on the static analysis of the identified signatures and the symbolic execution.

3. The method of claim 1, further comprising:
  generating a report comprising at least one of the identified unexpected or unknown behaviors.

4. The method of claim 1, wherein identifying signatures from the firmware image relating to USB operation comprises:
  identifying constant parts in all relevant descriptor types of the firmware image;
  scanning a data segment of binary of the firmware image for potential memory locations that may hold one or more of the relevant descriptors;
  computing a set of potential memory locations that correspond to an EP0 buffer;
  identifying instructions that copy data from candidate HID report descriptor buffers to candidate EP0 buffers as target instructions; and
  returning the identified as output along with the candidate EP0 addresses.

5. The method of claim 1, wherein identifying signatures from the firmware image relating to USB operation comprises:
  associating a tuple with a source and destination of an instruction of the firmware image and store the tuple in a map M, wherein a first component of the tuple represents a potential address value and a second component represents a tracked address value, wherein the tracked address value represents the memory location from which data originates;
  locating store instructions that copy constant values to memory mapped registers and storing the located store instructions in a work list; and
  processing each located store instruction of the located store instructions of the work list, one at a time, until all of the located store instructions have been processed, wherein processing a located store instruction comprises locating uses of a destination value of the located store instruction i and propagates a tuple M(i.dst) based on a type of a dependent instruction.

6. The method of claim 1, further comprising detecting concrete data flows to endpoint buffers, wherein detecting the concrete data flows comprises:
  computing candidate endpoint buffers based on a given number of maximum endpoints to be considered and constant offsets;
  identifying store instructions that may be storing to an endpoint buffer;
  identifying add and subtract instructions that may be manipulating counters;
  marking all counter locations as symbolic in addition to the other variables symbolic addressed that have been passed as an input in the image; and
  detecting and storing suspicious instructions.

7. The method of claim 1, further comprising detecting inconsistent data flows, wherein detecting inconsistent data flows comprises:
  executing a symbolic execution algorithm with one or more listeners;
  recording whether a store into a memory location gets its data from a symbolic or a concrete source along with an associated block identifier as context information;
  upon termination of the symbolic execution algorithm, identifying memory locations that are known to receive symbolic values in some contexts and concrete values in others;
  storing instructions that write to such memory locations using concrete sources; and
  returning the instructions.

8. An apparatus for analyzing firmware of a Universal Serial Bus (USB) device, the apparatus comprising at least one processor and at least one memory storing instructions that, with the at least one processor, cause the apparatus to:
  receive a firmware image extracted from the USB device;
  identify signatures from the firmware image relating to USB operation;
  build an expected model of operation of the USB device using the identified signatures and a database of operational information regarding USB devices;
  generate a recovered model of operation of the USB device based on the firmware image and the identified signatures, wherein generating the recovered model of operation of the USB device comprises:
    performing static analysis of the identified signatures to identify a set of target instructions relevant to an attack scenario; and
    performing symbolic execution using the intermediate representation to identify reachability of each target instruction in the set of target instructions;
  identify memory locations that need to be represented symbolically, wherein identifying the memory locations comprises:
    storing locations written inside an interrupt function on a current path in a map that is registered with a symbolic execution engine;
    detecting load instructions reading from memory locations that have not been written in a same interrupt function and on the current path;
    adding a source location of a detected load instruction to a set of symbolic values; and restarting symbolic execution using an updated set of symbolic values comprising the source location; and compare the recovered model of operation with the expected model of operation to identify unexpected or unknown behaviors.

9. The apparatus of claim 8, wherein generating the recovered model of operation of the USB device prior to performing static analysis, generating an intermediate representation corresponding to the firmware image; and subsequent performing symbolic execution, constructing the recovered model of operation of the USB device based on the static analysis of the identified signatures and the symbolic execution.

10. The apparatus of claim 8, wherein the apparatus is further caused to:

generate a report comprising at least one of the identified unexpected or unknown behaviors.

11. The apparatus of claim 8, wherein identifying signatures from the firmware image relating to USB operation comprises:

identifying constant parts in all relevant descriptor types of the firmware image;

scanning a data segment of binary of the firmware image for potential memory locations that may hold one or more of the relevant descriptors;

computing a set of potential memory locations that correspond to an EP0 buffer;

identifying instructions that copy data from candidate HID report descriptor buffers to candidate EP0 buffers as target instructions; and returning the identified as output along with the candidate EP0 addresses.

12. The apparatus of claim 8, wherein identifying signatures from the firmware image Mated relating to USB operation comprises:

associating a tuple with a source and destination of an instruction of the firmware image and store the tuple in a map M, wherein a first component of the tuple represents a potential address value and a second component represents a tracked address value, wherein the tracked address value represents the memory location from which data originates;

locating store instructions that copy constant values to memory mapped registers and storing the located store instructions in a work list; and processing each located store instruction of the located store instructions of the work list, one at a time, until all of the located store instructions have been processed, wherein processing a located store instruction comprises locating uses of a destination value of the located store instruction i and propagates a tuple M(i.dst) based on a type of a dependent instruction.

13. The apparatus of claim 8, wherein the apparatus is further caused to detect concrete data flows to endpoint buffers, wherein detecting the concrete data flows comprises:

computing candidate endpoint buffers based on a given number of maximum endpoints to be considered and constant offsets;

identifying store instructions that may be storing to an endpoint buffer;

identifying add and subtract instructions that may be manipulating counters;

marking all counter locations as symbolic in addition to the other variables symbolic addressed that have been passed as an input in the image; and detecting and storing suspicious instructions.

14. The apparatus of claim 8, wherein the apparatus is further caused to detect inconsistent data flows, wherein detecting inconsistent data flows comprises:

executing a symbolic execution algorithm with one or more listeners;

recording whether a store into a memory location gets its data from a symbolic or a concrete source along with an associated block identifier as context information;

upon termination of the symbolic execution algorithm, identifying memory locations that are known to receive symbolic values in some contexts and concrete values in others;

storing instructions that write to such memory locations using concrete sources; and returning the instructions.

15. A computer readable medium for analyzing firmware of a Universal Serial Bus (USB) device, the computer readable medium comprising a non-transitory computer storage medium storing instructions that, when executed by at least one processor, cause the processor to:

receive a firmware image extracted from the USB device;

identify signatures from the firmware image relating to USB operation;

build an expected model of operation of the USB device using the identified signatures and a database of operational information regarding USB devices;

generate a recovered model of operation of the USB device based on the firmware image and the identified signatures, wherein generating the recovered model of operation of the USB device comprises:

performing static analysis of the identified signatures to identify a set of target instructions relevant to an attack scenario; and performing symbolic execution using the intermediate representation to identify reachability of each target instruction in the set of target instructions;

identify memory locations that need to be represented symbolically, wherein identifying the memory locations comprises:

storing locations written inside an interrupt function on a current path in a map that is registered with a symbolic execution engine;

detecting load instructions reading from memory locations that have not been written in a same interrupt function and on the current path;

adding a source location of a detected load instruction to a set of symbolic values; and restarting symbolic execution using an updated set of symbolic values comprising the source location; and compare the recovered model of operation with the expected model of operation to identify unexpected or unknown behaviors.

16. The computer readable medium of claim 15, wherein generating the recovered model of operation of the USB device further comprises:

prior to performing static analysis, generating an intermediate representation corresponding to the firmware image; and subsequent performing symbolic execution, constructing the recovered model of operation of the USB device based on the static analysis of the identified signatures and the symbolic execution.

17. The computer readable medium of claim 15, wherein identifying signatures from the firmware image relating to USB operation comprises:

identifying constant parts in all relevant descriptor types of the firmware image;

scanning a data segment of binary of the firmware image for potential memory locations that may hold one or more of the relevant descriptors;

computing a set of potential memory locations that correspond to an EP0 buffer;

identifying instructions that copy data from candidate HID report descriptor buffers to candidate EP0 buffers as target instructions; and returning the identified as output along with the candidate EP0 addresses.

18. The computer readable medium of claim 15, wherein identifying signatures from the firmware image relating to USB operation comprises:

associating a tuple with a source and destination of an instruction of the firmware image and store the tuple in a map M, wherein a first component of the tuple represents a potential address value and a second component represents a tracked address value, wherein the tracked address value represents the memory location from which data originates;

locating store instructions that copy constant values to memory mapped registers and storing the located store instructions in a work list; and processing each located store instruction of the located store instructions of the work list, one at a time, until all of the located store instructions have been processed, wherein processing a located store instruction comprises locating uses of a destination value of the located store instruction i and propagates a tuple M(i.dst) based on a type of a dependent instruction.

* * * * *

UNITED STATES PATENT AND TRADEMARK OFFICE
CERTIFICATE OF CORRECTION

| | | |
|---|---|---|
| PATENT NO. | : 11,568,044 B2 | Page 1 of 1 |
| APPLICATION NO. | : 16/358385 | |
| DATED | : January 31, 2023 | |
| INVENTOR(S) | : Butler et al. | |

It is certified that error appears in the above-identified patent and that said Letters Patent is hereby corrected as shown below:

In the Claims

<u>Column 33</u>
Line 34, delete "Mated"

Signed and Sealed this
Eighteenth Day of April, 2023

*Katherine Kelly Vidal*

Katherine Kelly Vidal
*Director of the United States Patent and Trademark Office*